US011151297B2

(12) United States Patent
Lai et al.

(10) Patent No.: US 11,151,297 B2
(45) Date of Patent: Oct. 19, 2021

(54) MULTIPLE FIN COUNT LAYOUT, METHOD, SYSTEM, AND DEVICE

(71) Applicant: TAIWAN SEMICONDUCTOR MANUFACTURING COMPANY, LTD., Hsinchu (TW)

(72) Inventors: Po-Chia Lai, Fremont, CA (US); Ming-Chang Kuo, Qionlin Township (TW); Jerry Chang Jui Kao, Taipei (TW); Wei-Ling Chang, Hsinchu (TW); Wei-Ren Chen, Hsinchu (TW); Hui-Zhong Zhuang, Kaohsiung (TW); Stefan Rusu, Sunnyvale, CA (US); Lee-Chung Lu, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/065,086

(22) Filed: Oct. 7, 2020

(65) Prior Publication Data

US 2021/0271797 A1    Sep. 2, 2021

Related U.S. Application Data

(60) Provisional application No. 62/982,227, filed on Feb. 27, 2020.

(51) Int. Cl.
*G06F 30/392*    (2020.01)
*G06F 119/06*    (2020.01)

(52) U.S. Cl.
CPC ........ *G06F 30/392* (2020.01); *G06F 2119/06* (2020.01)

(58) Field of Classification Search
USPC .......................................................... 716/119
See application file for complete search history.

(56) References Cited

U.S. PATENT DOCUMENTS 7,260,442 B2    8/2007    Hwang et al.
9,256,709 B2    2/2016    Yu et al.
(Continued)

FOREIGN PATENT DOCUMENTS

CN    104050306 A    9/2014
CN    110046369 A    7/2019
(Continued)

OTHER PUBLICATIONS

Office Action dated Aug. 30, 2021 for corresponding case No. TW 11020841570. (pp. 1-4).

*Primary Examiner* — Mohammed Alam
(74) *Attorney, Agent, or Firm* — Hauptman Ham, LLP

(57) ABSTRACT

A method includes positioning adjacent first through fourth active regions in a cell of an IC layout diagram, the first active region being a first type of an n-type or a p-type and corresponding to a first total number of fins, the second active region being a second type of the n-type or the p-type and corresponding to a second total number of fins, the third active region being the second type and corresponding to a third total number of fins, and the fourth active region being the first type and corresponding to a fourth total number of fins. Each of the first and second total numbers of fins is greater than each of the third and fourth total numbers of fins, and at least one of the positioning the first, second, third, or fourth active regions is performed by a processor.

20 Claims, 17 Drawing Sheets

(56) References Cited

U.S. PATENT DOCUMENTS

| | | | |
|---|---|---|---|
| 9,646,966 B2 | 5/2017 | Moroz | |
| 2014/0040838 A1* | 2/2014 | Liu | G03F 1/36 |
| | | | 716/53 |
| 2015/0278429 A1* | 10/2015 | Chang | G03F 1/36 |
| | | | 716/52 |
| 2018/0211948 A1* | 7/2018 | Chu | G06F 30/394 |
| 2019/0286783 A1* | 9/2019 | Yang | G06F 30/392 |
| 2020/0134122 A1* | 4/2020 | Huang | H01L 27/0924 |

FOREIGN PATENT DOCUMENTS

| | | |
|---|---|---|
| JP | 6312373 B2 | 4/2018 |
| TW | 201608404 A | 3/2016 |
| TW | 201619861 A | 6/2016 |
| TW | 201834186 A | 9/2018 |
| TW | 202001417 A | 1/2020 |
| TW | 202002032 A | 1/2020 |

\* cited by examiner

MULTIPLE FIN COUNT LAYOUT, METHOD, SYSTEM, AND DEVICE

PRIORITY CLAIM

The present application claims the priority of U.S. Provisional Application No. 62/982,227, filed Feb. 27, 2020, which is incorporated herein by reference in its entirety.

BACKGROUND

The ongoing trend in miniaturizing integrated circuits (ICs) has resulted in progressively smaller devices which consume less power, yet provide more functionality at higher speeds than earlier technologies. In some cases, IC technology includes fin field-effect transistors (FinFETs) in which channel geometries are condensed along multiple fin dimensions.

Such miniaturization has been achieved through design and manufacturing innovations tied to increasingly strict specifications. Various electronic design automation (EDA) tools are used to generate, revise, and verify designs for semiconductor devices while ensuring that design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
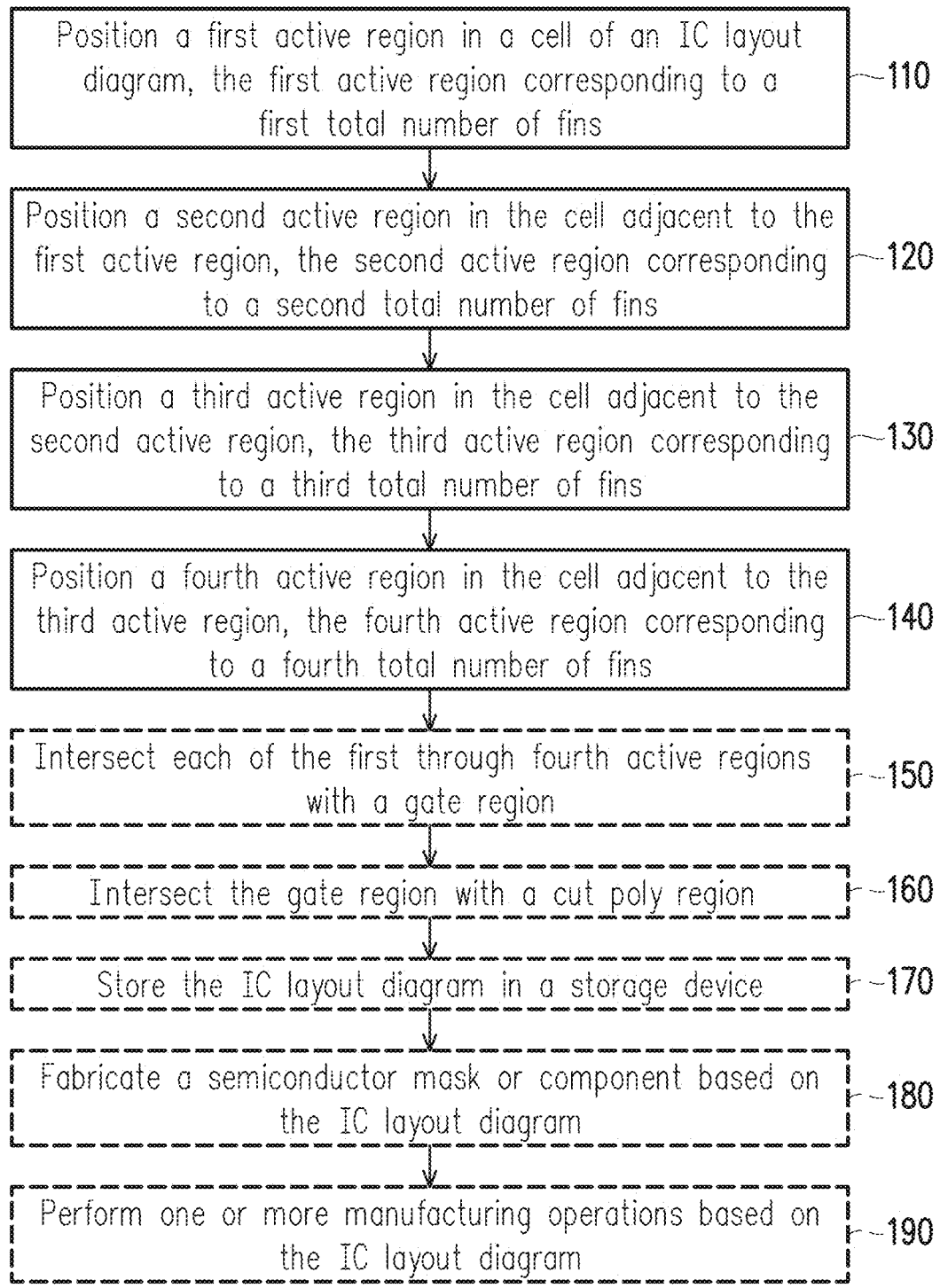
FIG. 1 is a flowchart of a method of generating an IC layout diagram, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, an IC layout, and a device manufactured based on the IC layout, includes transistors distributed among regions having varying fin counts. By distributing transistors among relatively high and low fin counts, the relatively high fin counts are selectively applied to critical circuit blocks such that circuit power is capable of being reduced while maintaining speed and area requirements compared to approaches in which blocks of transistors are not assigned to relatively high and low fin counts.

FIG. 1 is a flowchart of a method 100 of generating an IC layout diagram, in accordance with some embodiments. In some embodiments, generating the IC layout diagram includes generating an IC layout diagram, e.g., an IC layout diagram 200 discussed below with respect to FIG. 2, corresponding to an IC device, e.g., an IC device 700 discussed below with respect to FIG. 7, manufactured based on the generated IC layout diagram. Non-limiting examples of IC devices include logic devices, flip-flops, multiplexers, processing devices, signal processing circuits, or the like.

In some embodiments, some or all of the operations of method 100 are executed by a processor of a computer. In some embodiments, some or all of the operations of method 100 are executed by a processor 802 of an IC layout diagram generation system 800, discussed below with respect to FIG. 8.

Some or all of the operations of method 100 are capable of being performed as part of a design procedure performed in a design house, e.g., a design house 920 discussed below with respect to FIG. 9.

In some embodiments, the operations of method 100 are performed in the order depicted in FIG. 1. In some embodiments, the operations of method 100 are performed simultaneously and/or in an order other than the order depicted in FIG. 1. In some embodiments, one or more operations are performed before, between, during, and/or after performing one or more operations of method 100.

In some embodiments, some or all of the operations of method 100 are included in one or more operations of a method of operating an IC manufacturing system, e.g., operation 340 of method 300 discussed below with respect to FIGS. 3-6.

Figure 2:
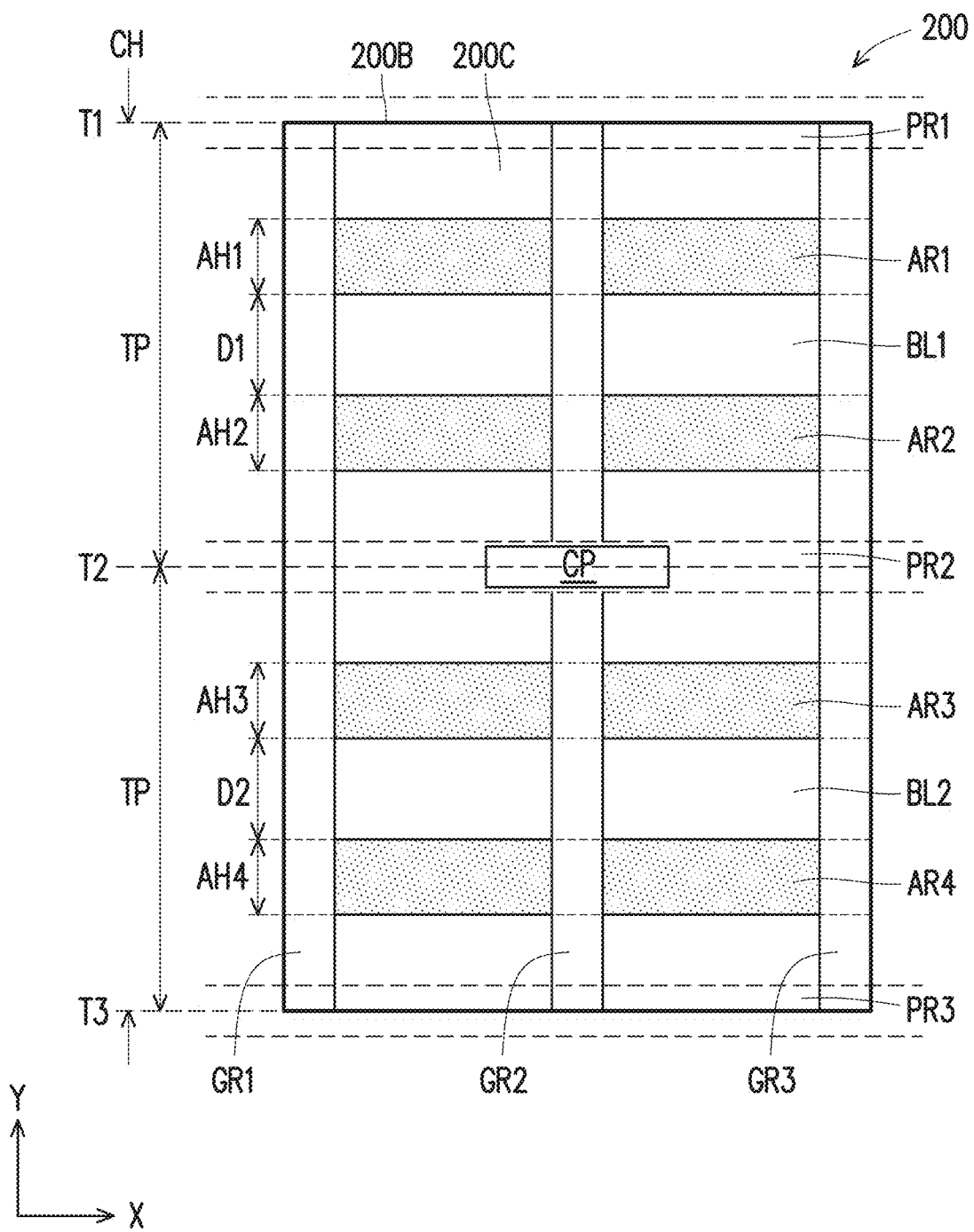
FIG. 2 depicts an IC layout diagram, in accordance with some embodiments.

FIG. 2 is a depiction of a non-limiting example of IC layout diagram 200 generated by executing one or more operations of method 100 as discussed below, in some embodiments. IC layout diagram 200 is simplified for the purpose of illustration. In various embodiments, IC layout diagram 200 includes features in addition to those depicted in FIG. 2, e.g., one or more transistor elements, vias, contacts, isolation structures, wells, conductive elements, or the like.

FIG. 2 depicts a cell 200C, an X direction, and a Y direction perpendicular to the X direction. The X direction being depicted as horizontal with respect to the page and the Y direction being depicted as vertical are a non-limiting example for the purpose of illustration. In various embodiments, the X and Y directions are perpendicular to each other and have orientations other than that depicted in FIG. 2. The X direction includes a positive X direction depicted in FIG. 2 and a negative X direction (not labeled) opposite to the positive X direction. The Y direction includes a positive Y direction depicted in FIG. 2 and a negative Y direction (not labeled) opposite to the positive Y direction.

Cell 200C includes a border 200B extending in the Y direction from a track T1 to a track T3, thereby having a height CH, active regions AR1-AR4 extending in the X direction, and gate regions GR1-GR3 extending in the Y direction and intersecting each active region AR1-AR4. Active regions AR1 and AR2 are positioned in a block region BL1 between track T1 and a track T2, and active regions AR3 and AR4 are positioned in a block region BL2 between tracks T2 and T3. A cut poly region CP extends in the X direction along track T2 and intersects gate region GR2 between active regions AR2 and AR3.

An active region, e.g., an active region AR1-AR4, is a region in an IC layout diagram included in a manufacturing process as part of defining an active area, also referred to as an oxide diffusion or definition (OD) in some embodiments, in a semiconductor substrate.

An active area is a continuous section of the semiconductor substrate having either n-type or p-type doping that includes various semiconductor structures, including one or more fins of a FinFET in some embodiments. In various embodiments, an active area is located within a well, i.e., either an n-well or a p-well, within the semiconductor substrate and/or is electrically isolated from other elements in the semiconductor substrate by one or more isolation structures, e.g., one or more shallow trench isolation (STI) structures.

A fin is a raised, elongated portion of an active area extending in a first direction, e.g., the X direction in the embodiment depicted in FIG. 2, and including one or more of an elementary semiconductor, e.g., silicon (Si) or germanium (Ge), a compound semiconductor, e.g., silicon germanium (SiGe), silicon carbide (SiC), gallium arsenide (GaAs), gallium phosphide (GaP), indium phosphide (InP), indium arsenide (InAs), or indium antimonide (ISb), or an alloy semiconductor, e.g., GaAsP, AlInAs, AlGaAs, GaInAs, GaInP, or GaInAsP, or the like.

Each active region corresponds to a total number of fins. In various embodiments, a given active area corresponds to a total number of fins ranging from one to six. In some embodiments, a given active area corresponds to a total number of fins greater than six.

In some embodiments, an active area includes one or more source/drain (S/D) structures corresponding to one or more S/D regions (not shown) within the active region used to define the active area. An S/D structure is a semiconductor structure within an active area, adjacent to or including portions of the one or more fins, and configured to have a doping type opposite to that of other portions of the active area. In some embodiments, an S/D structure is configured to have lower resistivity than other portions of the active area, e.g., by including one or more portions having doping concentrations greater than one or more doping concentrations otherwise present throughout the active area. In various embodiments, S/D structures include epitaxial regions of a semiconductor material, e.g., Si, SiGe, and/or SiC.

A gate region, e.g., a gate region GR1-GR3, is a region in an IC layout diagram included in a manufacturing process as part of defining a gate structure overlying the semiconductor substrate.

A gate structure is a volume extending in a direction perpendicular to that of an active area, e.g., the Y direction in the embodiment depicted in FIG. 2, and including a gate electrode substantially surrounded by one or more dielectric layers. The gate electrode includes one or more conductive segments including one or more conductive materials, e.g., polysilicon, one or more metals, and/or one or more other suitable materials, and the gate electrode is thereby configured to control a voltage along the underlying and adjacent dielectric layers. In various embodiments, a dielectric layer includes one or more of silicon dioxide and/or another suitable material, e.g., a dielectric material having a k value higher than 3.8 or 7.0, also referred to as a high-k dielectric material in some embodiments. In some embodiments, a high-k dielectric material includes aluminum oxide, hafnium oxide, lanthanum oxide, or another suitable material.

In some cases, a location at which a gate region intersects an active region in an IC layout diagram corresponds to a transistor in the corresponding IC device that includes the portion of the corresponding gate structure overlying the corresponding active area, portions of the active area below and partially surrounded by the gate structure, and S/D structures adjacent to the gate structure. In various embodiments, the transistor is a p-type metal oxide semiconductor (PMOS) transistor or an n-type metal oxide semiconductor (NMOS) transistor, depending on the doping type of the active area corresponding to the associated active region. In other cases, a gate region intersects an active region at a location that does not correspond to a transistor, and the corresponding gate structure is referred to as a dummy gate structure in some embodiments.

A block region, e.g., block region BL1 or BL2, is a region in an IC layout diagram included in a design process as part of defining one or more locations of a subset of a plurality of transistors of a circuit, also referred to as a block or circuit block in some embodiments. The one or more locations correspond to total numbers of fins associated with each active region as discussed below, and with circuit block assignments as discussed below with respect to method 300 and FIGS. 3-7.

In the embodiment depicted in FIG. 2, locations in block region BL1 at which gate region GR2 intersects active regions AR1 and AR2 correspond to a first block of transistors (not labeled), e.g., configured as a first inverter, and locations in block region BL2 at which gate region GR2 intersects active regions AR3 and AR4 correspond to a second block of transistors (not labeled), e.g., configured as a second inverter.

A cut poly region, e.g., cut poly region CP, is a region in an IC layout diagram included in a manufacturing process as part of defining a discontinuity in some or all of a gate structure such that the corresponding gate electrode is separated into portions electrically isolated from each other.

In the embodiment depicted in FIG. 2, cut poly region CP defines in part a discontinuity in the gate electrode corresponding to gate region GR2 such that gates of the transistors corresponding to block region BL1 are electrically isolated from gates of the transistors corresponding to block region BL2.

A track, e.g., a track T1-T3, is a line in an IC layout diagram included in a manufacturing process as part of defining relative locations of IC structures corresponding to IC layout features oriented based on the track.

In the embodiment depicted in FIG. 2, tracks T1-T3 correspond to locations of power rails defined in part by respective power rail regions PR1-PR3, also referred to as conductive regions PR1-PR3 in some embodiments.

A conductive region, e.g., a power rail region PR1-PR3, is a region in an IC layout diagram included in a manufacturing process as part of defining one or more segments of one or more conductive layers in an IC device. In various embodiments, one or more of power rail regions PR1-PR3 corresponds to one or more segments of a same or different conductive layers in the IC device. In various embodiments, one or more of power rail regions PR1-PR3 corresponds to one or more of a buried metal layer, a first metal layer, a second metal layer, or a higher metal layer in the IC device.

Each of active regions AR1 and AR4 is one of an n-type corresponding to n-type doping or a p-type corresponding to p-type doping, and each of active regions AR2 and AR3 is the other of the n-type or the p-type. In embodiments in which active regions AR1 and AR4 are n-type, each of adjacent power rail regions PR1 and PR3 corresponds to a reference power rail configured to carry a reference voltage level, and power rail region PR2, adjacent to active regions AR2 and AR3, corresponds to a supply power rail configured to carry a power supply voltage level. In embodiments in which active regions AR1 and AR4 are p-type, each of adjacent power rail regions PR1 and PR3 corresponds to a supply power rail configured to carry the power supply voltage level, and power rail region PR2 corresponds to a reference power rail configured to carry the reference voltage level.

Active region AR1 corresponds to a first total number of fins, active region AR2 corresponds to a second total number of fins, active region AR3 corresponds to a third total number of fins, and active region AR4 corresponds to a fourth total number of fins. Each of the first and second total numbers of fins is greater than each of the third and fourth total numbers of fins. Accordingly, active regions AR1 and AR2 correspond to a collective total number of fins greater than a collective total number of fins corresponding to active regions AR3 and AR4.

In various embodiments, the first and second total number of fins are a same total number of fins or different total numbers of fins. In various embodiments, the third and fourth total number of fins are a same total number of fins or different total numbers of fins. In some embodiments, each of the first and second total numbers of fins is greater than or equal to three and each of the third and fourth total numbers of fins is less than three. In some embodiments, one or both of the first or second total numbers of fins is equal to three or four. In some embodiments, one or both of the third or fourth total numbers of fins is equal to one or two.

In some embodiments, a width of an active region, e.g., an active region AR1-AR4, varies in accordance with the total number of fins corresponding to the active region. In the embodiment depicted in FIG. 2, active regions AR1 and AR2 have a same total number of fins, e.g., three fins, active region AR1 has a height AH1 in the Y direction, and active region AR2 has a height AH2 in the Y direction equal to height AH1. Active regions AR3 and AR4 have a same total number of fins, e.g., two fins, active region AR3 has a height AH3 in the Y direction, and active region AR4 has a height AH4 in the Y direction equal to height AH3. In various embodiments, height AH2 is not equal to height AH1 and/or height AH4 is not equal to height AH3.

In the embodiment depicted in FIG. 2, heights AH1 and AH2 are greater than heights AH3 and AH4 in accordance with each of active regions AR1 and AR2 corresponding to greater total numbers of fins than the total numbers of fins corresponding to each of active regions AR3 and AR4. In various embodiments, active regions corresponding to a same total number of fins have different heights and/or active regions corresponding to different total numbers of fins have a same height.

In the embodiment depicted in FIG. 2, adjacent active regions AR1 and AR2 are separated by a distance D1, and adjacent active regions AR3 and AR4 are separated by a distance D2. Distance D2 is greater than distance D1 corresponding to heights AH3 and AH4 being less than heights AH1 and AH2. In various embodiments, distances between adjacent active region pairs having differing heights are the same and/or distances between adjacent active region pairs having the same heights are different from each other.

Two active regions are considered to be adjacent based on no other active region being positioned between the two active regions, independent of another IC layout feature being positioned between the two active regions. In the embodiment depicted in FIG. 2, active regions AR1 and AR2 are adjacent to each other, active regions AR2 and AR3 are adjacent to each other, and active regions AR3 and AR4 are adjacent to each other.

In the embodiment depicted in FIG. 2, each of active regions AR1-AR4 extends in the X direction between gate regions GR1 and GR3. In various embodiments, one or more of active regions AR1-AR4 extends between gate region GR2 and one of gate regions GR1 or GR3 and/or extends in the X direction beyond border 200B, e.g., into a cell (not shown) adjacent to cell 200C.

Tracks T1-T3 are spaced apart in the Y direction based on a pitch TP such that tracks T1 and T2 are separated by a distance equal to pitch TP, and tracks T2 and T3 are separated by a distance equal to pitch TP. Pitch TP corresponds to a standard cell height and in some embodiments is referred to a standard cell height TP. Height CH thereby corresponds to a distance equal to twice pitch TP, and in some embodiments cell 200C is referred to as a double height cell having a cell height CH.

In the embodiment depicted in FIG. 2, power rail regions PR1-PR3 overlap cell 200C such that cell 200C is considered to include portions of each of power rail regions PR1-PR3. In some embodiments, portions or all of power rail regions PR1-PR3 are not considered to be included in cell 200C, and are aligned relative to cell 200C based on tracks T1-T3.

In the embodiment depicted in FIG. 2, entireties of widths (not labeled) of gate regions GR1 and GR3 in the X direction overlap cell 200C within border 200B. In various embodiments, portions or all of the widths of one or both of gate regions GR1 and GR3 are positioned outside border 200B and thereby do not overlap cell 200C. In various embodiments, one or more of gate regions GR1-GR3 is a portion of a gate region shared with one or more cells (not shown) other than cell 200C.

In the embodiment depicted in FIG. 2, a total of three gate regions GR1-GR3 overlap cell 200C. In various embodiments, a total of fewer or greater than three gate regions overlap cell 200C.

In the embodiment depicted in FIG. 2, cut poly region CP is aligned with track T2, intersects gate region GR2 between active regions AR2 and AR3, and does not intersect either of gate regions GR1 or GR3. In various embodiments, cut poly region CP is not aligned with track T2 and otherwise intersects gate region GR2 between active regions AR2 and AR3, intersects gate region GR2 between active regions AR1 and AR2, or intersects gate region GR2 between active regions AR3 and AR4. In various embodiments, cut poly region CP intersects one or both of gate regions GR1 or GR3, does not intersect gate region GR2, and/or extends beyond border 200B outside of cell 200C.

In the embodiment depicted in FIG. 2, IC layout diagram 200 includes a single cut poly region CP. In some embodiments, IC layout diagram 200 does not include cut poly region CP. In various embodiments, IC layout diagram 200 includes one or more instances of cut poly region CP (not shown in FIG. 2) in addition to the instance of cut poly region CP depicted in FIG. 2.

The one or more instances of cut poly region CP thereby define, at least in part, discontinuities in the gate structures corresponding to the gate regions, e.g., gate regions GR1-GR3, such that circuit portions, or blocks, positioned in block region BL1 are electrically isolated from circuit portions positioned in block region BL2. The electrically isolated circuit portions are thereby capable of being independently electrically connected either to other circuit portions of the same circuit or to one or more separate circuits. Circuit portions in block regions BL1 and BL2 corresponding to one or more gate regions that are free from being intersected by one or more instances of cut poly region CP are thereby electrically connected to each other through the one or more gate regions.

At operation 110, a first active region is positioned in a cell of an IC layout diagram, the first active region corresponding to a first total number of fins and being a first type of an n-type or a p-type. Positioning the first active region in the cell includes positioning the first active region extending in a first direction and having a first height in a second direction perpendicular to the first direction. In some embodiments, the first active region having the first height includes the first active region having the first height corresponding to the first total number of fins.

The first active region corresponding to the first total number of fins includes the first total number of fins being greater than a threshold fin count. In various embodiments, the threshold fin count is equal to one, two, or three fins. In some embodiments, the first active region corresponding to the first total number of fins includes the first total number of fins being equal to three or four.

In some embodiments, positioning the first active region in the cell includes positioning the first active region in a first region of a double height cell, the first region corresponding to a standard cell height and the double height cell being double the standard cell height. In some embodiments, positioning the first active region in the cell of the IC layout diagram includes positioning active region AR1 in block region BL1 of double height cell 200C in IC layout diagram 200.

At operation 120, a second active region is positioned in the cell adjacent to the first active region, the second active region being a second type of the n-type or the p-type and corresponding to a second total number of fins. Positioning the second active region in the cell includes positioning the second active region extending in the first direction and having a second height in the second direction. In some embodiments, the second active region having the second height includes the second active region having the second height corresponding to the second total number of fins.

The second active region corresponding to the second total number of fins includes the second total number of fins being greater than the threshold fin count. In some embodiments, the second active region corresponding to the second total number of fins includes the second total number of fins being equal to the first total number of fins. In some embodiments, the second active region corresponding to the second total number of fins includes the second total number of fins being equal to three or four.

In some embodiments, positioning the second active region in the cell includes positioning the second active region in the double height cell. In some embodiments, positioning the second active region in the cell adjacent to the first active region includes the first and second active regions being positioned between a same two tracks of a total of three tracks, the same two tracks corresponding to the standard height cell and the three tracks corresponding to the double height cell.

In some embodiments, positioning the second active region in the cell adjacent to the first active region includes positioning active region AR2 adjacent to active region AR1 in block region BL1 of double height cell 200C in IC layout diagram 200.

At operation 130, a third active region is positioned in the cell adjacent to the second active region, the third active region being the second type of the n-type or the p-type and corresponding to a third total number of fins. Positioning the third active region in the cell includes positioning the third active region extending in the first direction and having a third height in the second direction. In some embodiments, the third active region having the third height includes the third active region having the third height corresponding to the third total number of fins.

The third active region corresponding to the third total number of fins includes the third total number of fins being less than or equal to the threshold fin count. In some embodiments, the third active region corresponding to the third total number of fins includes the third total number of fins being equal to one or two.

In some embodiments, positioning the third active region in the cell includes positioning the third active region in the double height cell. In some embodiments, positioning the third active region in the cell adjacent to the second active region includes the second active region being positioned between the first two tracks corresponding to the standard height cell of the total of three tracks corresponding to the double height cell, and the third active region being positioned between a second two tracks of the total of three tracks, the second two tracks also corresponding to the standard height cell.

In some embodiments, positioning the third active region in the cell adjacent to the second active region includes straddling a power rail track with the second and third active regions. In various embodiments, either the power rail track corresponds to a reference power rail and the second type is the n-type, or the power rail track corresponds to a supply power rail and the second type is the p-type.

In some embodiments, positioning the third active region in the cell adjacent to the second active region includes positioning active region AR3 in block region BL2 adjacent to active region AR2 in block region BL1 in cell 200C in IC layout diagram 200.

At operation 140, a fourth active region is positioned in the cell adjacent to the third active region, the fourth active region being the first type of the n-type or the p-type and corresponding to a fourth total number of fins. Positioning the fourth active region in the cell includes positioning the fourth active region extending in the first direction and having a fourth height in the second direction. In some embodiments, the fourth active region having the fourth height includes the fourth active region having the fourth height corresponding to the fourth total number of fins.

The fourth active region corresponding to the fourth total number of fins includes the fourth total number of fins being less than or equal to the threshold fin count. In some embodiments, the fourth active region corresponding to the fourth total number of fins includes the fourth total number of fins being equal to the third total number of fins. In some embodiments, the fourth active region corresponding to the fourth total number of fins includes the fourth total number of fins being equal to one or two.

In some embodiments, positioning the fourth active region in the cell includes positioning the fourth active region in the double height cell. In some embodiments, positioning the fourth active region in the cell adjacent to the third active region includes the third and fourth active regions being positioned between the same second two tracks of the total of three tracks corresponding to the double height cell.

In some embodiments, positioning the fourth active region in the cell adjacent to the third active region includes positioning active region AR4 in block region BL2 adjacent to active region AR3 in block region BL2 in cell 200C in IC layout diagram 200.

At operation 150, in some embodiments, each of the first through fourth active regions is intersected with a gate region. Intersecting each of the first through fourth active regions with the gate region includes defining, at least in part, at least one location of a transistor formed based on the IC layout diagram, e.g., IC layout diagram 200. In some embodiments, intersecting each of the first through fourth active regions with the gate region includes defining, at least in part, locations in a plurality of block regions, e.g., block regions BL1 and BL2, of a plurality of transistors formed based on the IC layout diagram, the plurality of transistors including at least one transistor having the first or second total number of fins and at least one transistor having the third or fourth total number of fins. In some embodiments, intersecting each of the first through fourth active regions with the gate region includes defining, at least in part, locations of the plurality of transistors including at least one transistor having each of the first, second, third, and fourth total number of fins. In some embodiments, intersecting each of the first through fourth active regions with the gate region includes defining, at least in part, at least one location of a dummy gate.

In some embodiments, intersecting each of the first through fourth active regions with the gate region is part of intersecting one or more of the first through fourth active regions with more than one gate region of a plurality of gate regions. In some embodiments, intersecting each of the first through fourth active regions with the gate region includes intersecting each of active regions AR1-AR4 with at least one of gate regions GR1-GR3 in IC layout diagram 200.

At operation 160, in some embodiments, the gate region is intersected with a cut poly region. Intersecting the gate region with the cut poly region is part of defining a location of a discontinuity in a gate electrode manufactured based on the gate region such that the corresponding gate electrode is separated into portions electrically isolated from each other.

In various embodiments, intersecting the gate region with the cut poly region is part of intersecting one or more gate regions of a plurality of gate regions with one or more cut poly regions of a plurality of cut poly regions.

In some embodiments, intersecting the gate region with the cut poly region includes intersecting gate region GR2 with cut poly region CP in IC layout diagram 200.

At operation 170, in some embodiments, the IC layout diagram is generated and stored in a storage device. Generating the IC layout diagram is performed by a processor, e.g., processor 802 of IC layout diagram generation system 800 discussed below with respect to FIG. 8.

In some embodiments, generating the IC layout diagram includes positioning one or more features (not shown), e.g., a contact, via, or conductive region, corresponding to one or more IC structures manufactured based on the one or more features and configured to provide electrical connections to one or more of the active areas corresponding to active regions AR1-AR4 and/or the gate electrodes corresponding to gate regions GR1-GR3.

In various embodiments, storing the IC layout diagram in the storage device includes storing the IC layout diagram in a non-volatile, computer-readable memory or a cell library, e.g., a database, and/or includes storing the IC layout diagram over a network. In various embodiments, storing the IC layout diagram in the storage device includes storing the IC layout diagram in cell library 807 and/or over network 814 of IC layout diagram generation system 800, discussed below with respect to FIG. 8.

In various embodiments, generating and storing the IC layout diagram includes generating and storing one or more of IC layout diagram 200 discussed above with respect to FIG. 2 or IC layout diagrams 400C, 400E, or 400G discussed below with respect to FIGS. 4A-4I.

At operation 180, in some embodiments, at least one of one or more semiconductor masks, or at least one component in a layer of a semiconductor IC is fabricated based on the IC layout diagram. Fabricating one or more semiconductor masks or at least one component in a layer of a semiconductor IC is discussed below with respect to IC manufacturing system 900 and FIG. 9.

In various embodiments, fabricating one or more semiconductor masks or at least one component in the layer of the semiconductor IC is based on one or more of IC layout diagram 200 discussed above with respect to FIG. 2 or IC layout diagrams 400C, 400E, or 400G discussed below with respect to FIGS. 4A-4I.

At operation 190, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 9.

In various embodiments, performing one or more manufacturing operations is based on one or more of IC layout diagram 200 discussed above with respect to FIG. 2 or IC layout diagrams 400C, 400E, or 400G discussed below with respect to FIGS. 4A-4I.

By executing some or all of the operations of method 100, an IC layout diagram, e.g., IC layout diagram 200, is generated in which a set of transistors is defined having subsets including relatively high and low fin counts such that a circuit corresponding to the IC layout diagram includes transistors having a combination of fin counts. Because power and driving ability, and thereby speed, each increase with increasing numbers of fins, defining a set of transistors having a combination of fin counts enables relatively high fin counts to be selectively applied to circuit blocks in which timing is most critical for overall circuit speed targets. Thus, circuit power is capable of being reduced while maintaining speed and area requirements compared to approaches in which circuits correspond to IC layout diagrams that do not include relatively high and low fin counts.

Figure 3:
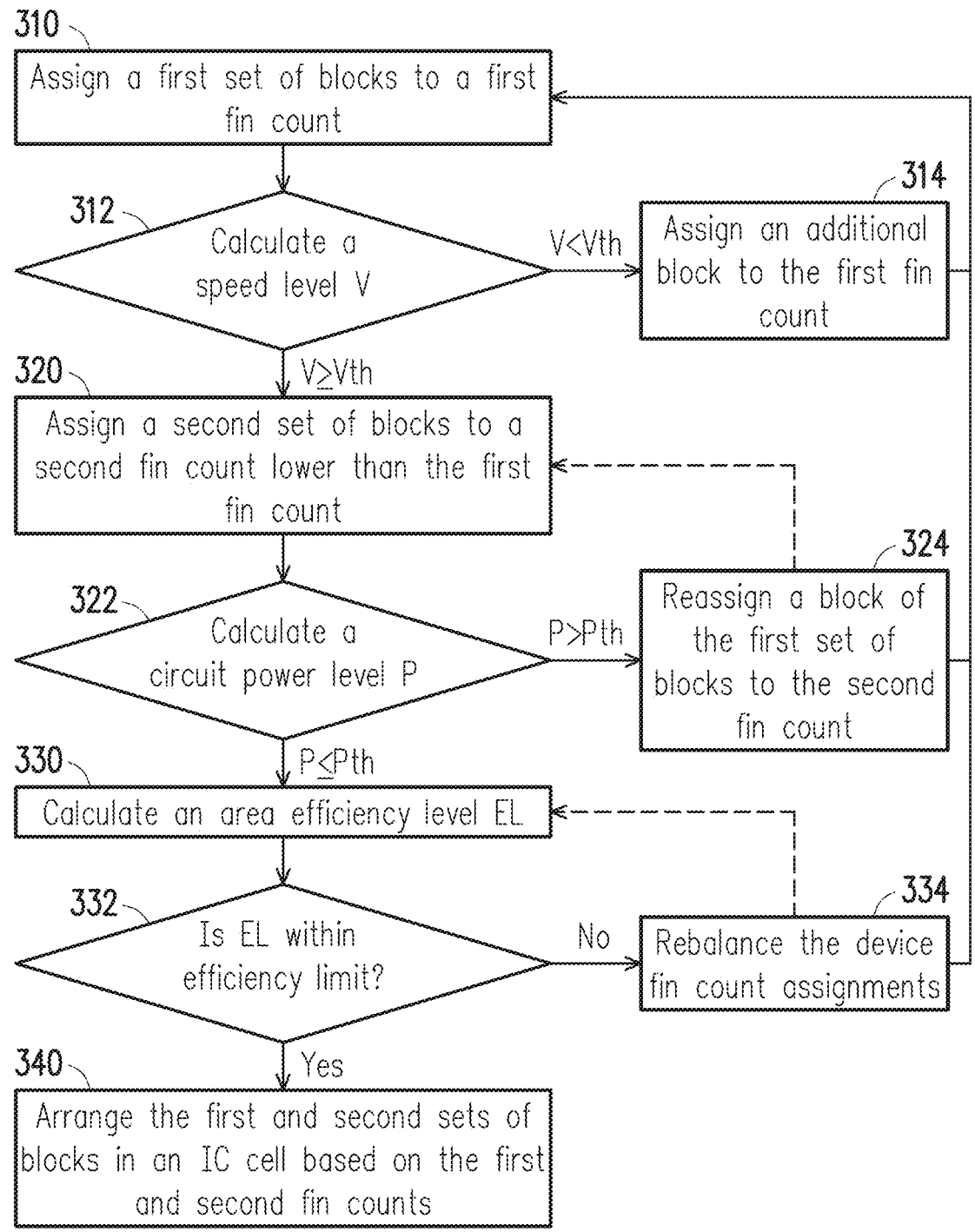
FIG. 3 is a flowchart of a method of generating an IC layout diagram, in accordance with some embodiments.

FIG. 3 is a flowchart of a method 300 of operating an IC manufacturing system, in accordance with some embodiments. In some embodiments, operating the IC manufacturing system includes generating an IC layout diagram, e.g., IC layout diagram 200 discussed above with respect to FIGS. 1 and 2, or IC layout diagram 400C, 400E, or 400G discussed below with respect to FIGS. 4A-4I, corresponding to an IC structure, e.g., IC device 700 discussed below with respect to FIG. 7, manufactured based on the generated IC layout diagram.

In some embodiments, some or all of the operations of method 300 are executed by a processor of a computer. In some embodiments, some or all of the operations of method 300 are executed by processor 802 of IC layout diagram generation system 800, discussed below with respect to FIG. 8.

Some or all of the operations of method 300 are capable of being performed as part of a design procedure performed in a design house, e.g., design house 920 discussed below with respect to FIG. 9.

In some embodiments, the operations of method 300 are performed in the order depicted in FIG. 3. In some embodiments, the operations of method 300 are performed simultaneously and/or in an order other than the order depicted in FIG. 3. In some embodiments, one or more operations are performed before, between, during, and/or after performing one or more operations of method 300.

Figure 4A:
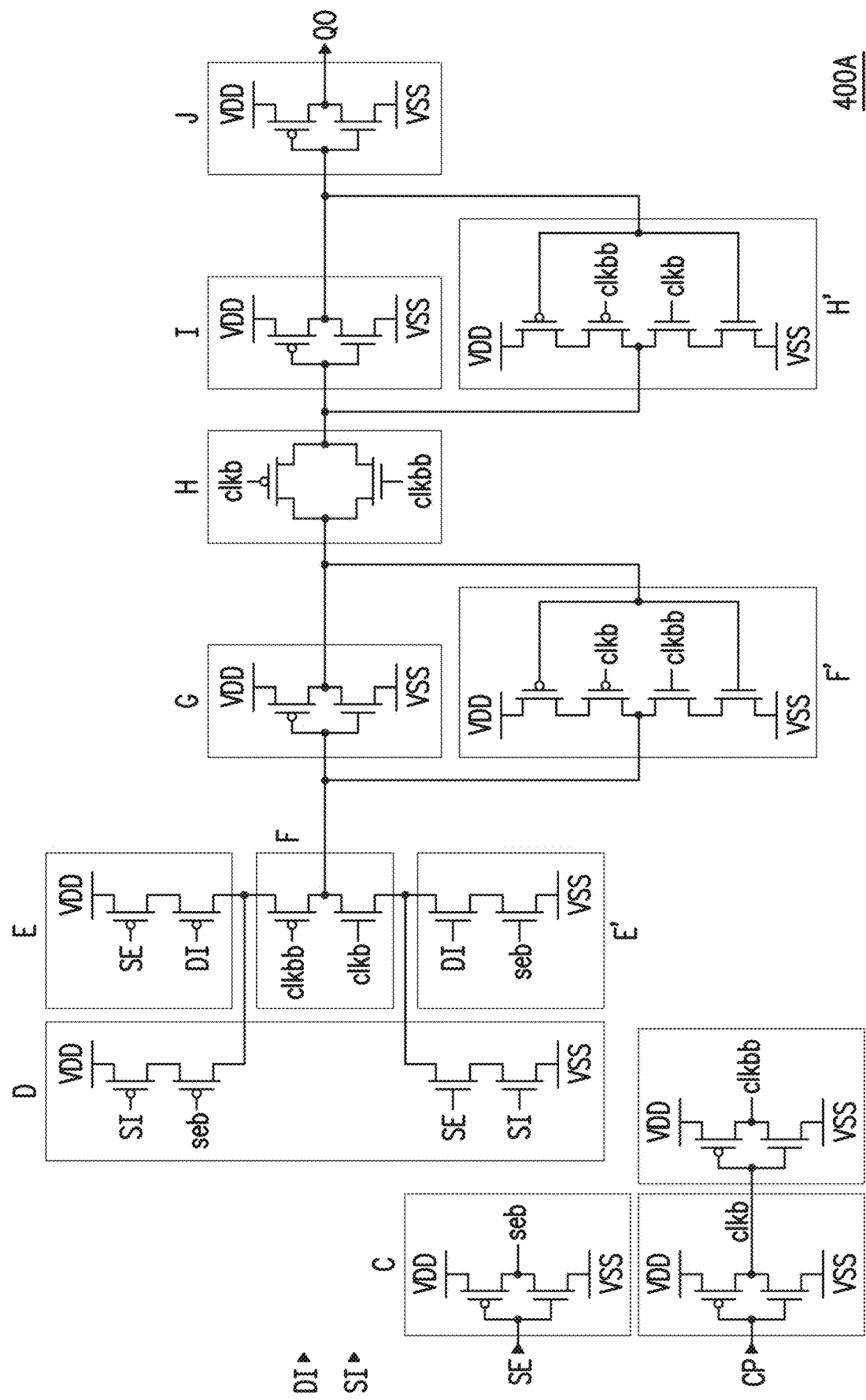
FIGS. 4A-6 illustrate non-limiting examples of operations of a method of generating an IC layout diagram, in accordance with some embodiments.

FIGS. 4A-6 illustrate non-limiting examples of operations of method 300, in accordance with some embodiments. As further discussed below, FIGS. 4A-4I illustrate non-limiting examples based on a flip-flop circuit and include IC layout diagrams 400C, 400E, and 400G depicted in FIGS. 4C, 4E, and 4G, respectively. FIG. 4A is a schematic diagram of the flip-flop circuit corresponding to execution of operation 310, FIGS. 4B and 4C are respective schematic and layout diagrams corresponding to a first non-limiting example of executing some or all of operations 312-340 on the flip-flop circuit, FIGS. 4D and 4E are respective schematic and layout diagrams corresponding to a second non-limiting example of executing some or all of operations 312-340 on the flip-flop circuit, and FIGS. 4F and 4G are respective schematic and layout diagrams corresponding to a third non-limiting example of executing some or all of operations 312-340 on the flip-flop circuit. FIGS. 4H and 4I depict operating parameters corresponding to the non-limiting examples of FIGS. 4A-4G.

Figure 5:
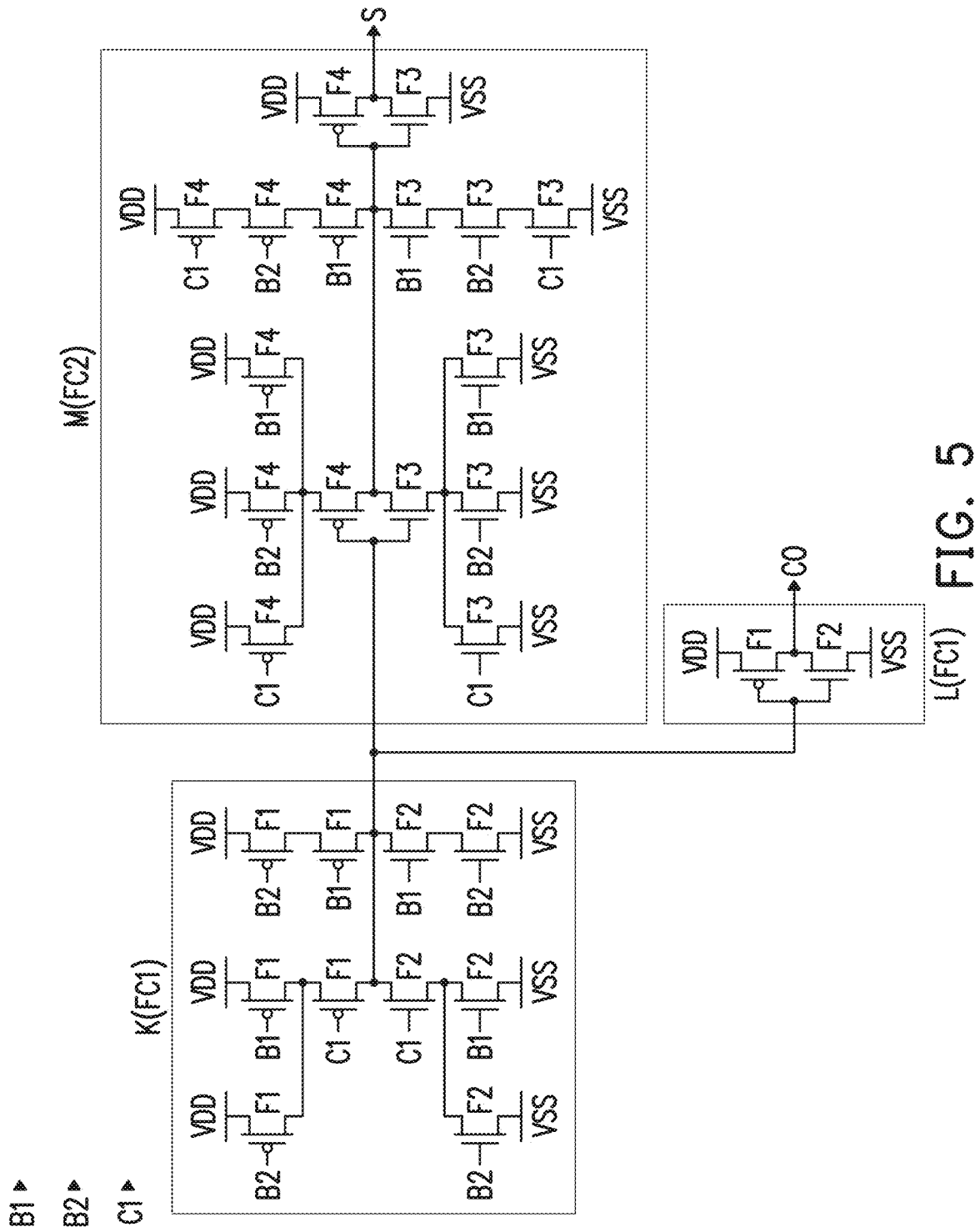
Figure 6:
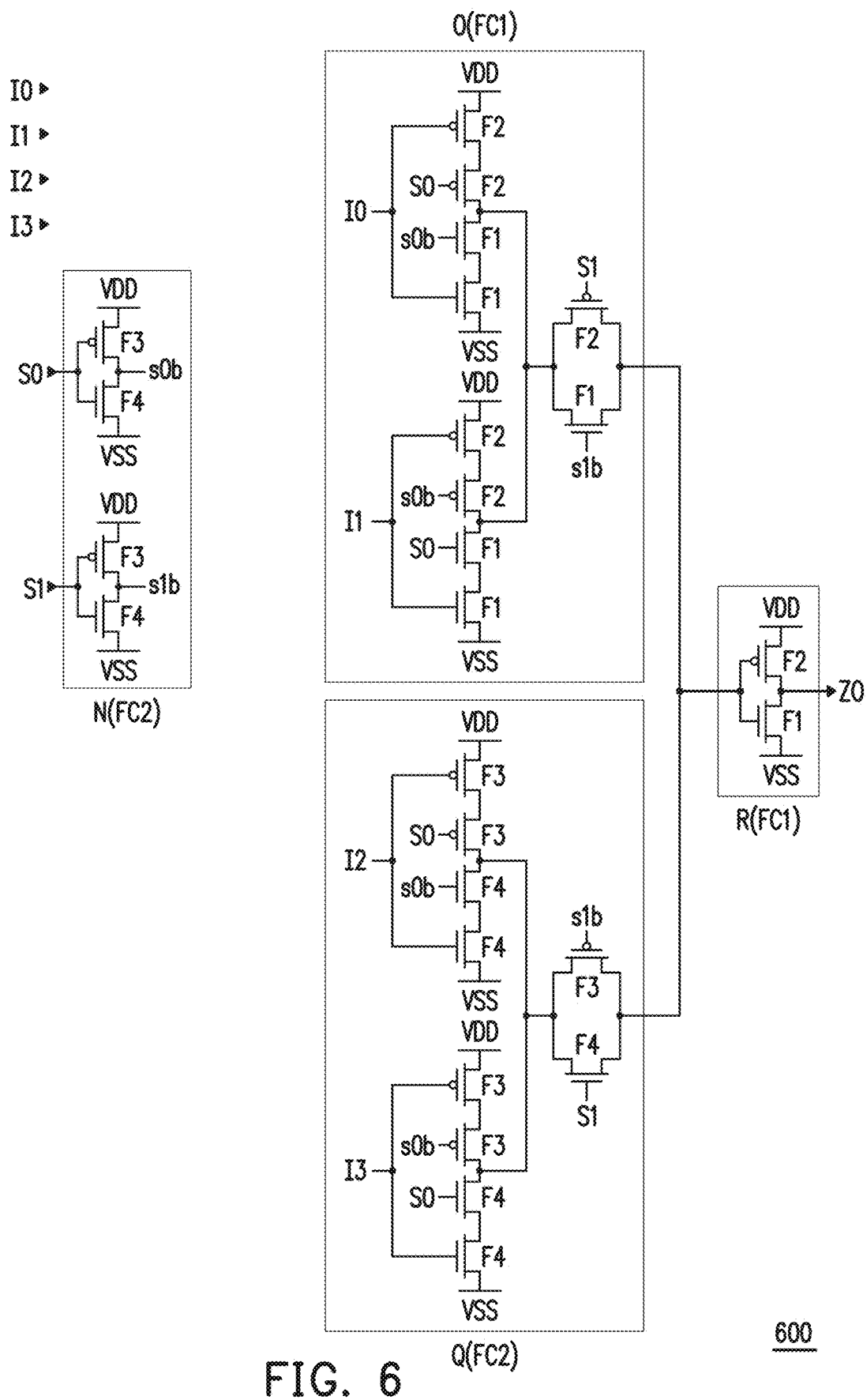

As further discussed below, FIG. 5 illustrates a non-limiting example based on executing some or all of operations 310-340 on an adder circuit, and FIG. 6 depicts a non-limiting example based on executing some or all of operations 310-340 on a multiplexer (MUX) circuit.

Each of IC layout diagrams 400C, 400E, and 400G is an embodiment of IC layout diagram 200 discussed above with respect to FIGS. 1 and 2 and is simplified for the purpose of clarity. In various embodiments, one or more of IC layout diagrams 400C, 400E, or 400G includes features in addition to those depicted in FIGS. 4C, 4E, and 4G, e.g., one or more transistor elements, power rails, isolation structures, wells, conductive elements, or the like. Each of FIGS. 4C, 4E, and 4G further depicts the X and Y directions discussed above with respect to FIG. 2.

At operation 310, a first set of blocks of a circuit is assigned to a first fin count. The circuit includes pluralities of PMOS and NMOS transistors, and assigning the first set of blocks to the first fin count includes assigning at least one circuit block including at least one PMOS transistor and at least one NMOS transistor. The first fin count is a sum of a first total number of fins corresponding to one of the at least one PMOS transistor or at least one NMOS transistor and a second total number of fins corresponding to the other of the at least one PMOS transistor or at least one NMOS transistor. In some embodiments, the circuit includes some or all of the pluralities of PMOS and NMOS transistors configured as transistor pairs, e.g., inverters and/or transmission gates.

In some embodiments, assigning the first set of blocks to the first fin count includes the first fin count being greater than or equal to six. In various embodiments, assigning the first set of blocks to the first fin count includes the first total number of fins being equal to the second total number of fins or the first total number of fins being different from the second total number of fins. In various embodiments, assigning the first set of blocks to the first fin count includes one or both of the first or second total numbers of fins being equal to three or four. In some embodiments, assigning the first set of blocks to the first fin count includes assigning the first set of blocks to block region BL1 including active region AR1 corresponding to the first total number of fins and active region AR2 corresponding to the second total number of fins as discussed above with respect to FIGS. 1 and 2.

In some embodiments, assigning the first set of blocks to the first fin count includes receiving an IC layout cell from a cell library. In some embodiments, receiving the IC layout cell from the cell library includes receiving the pluralities of PMOS and NMOS transistors pre-assigned to a second fin count lower than the first fin count. In some embodiments, assigning the first set of blocks to the first fin count includes a second set of blocks remaining assigned to the second fin count. In some embodiments, assigning the first set of blocks to the first fin count includes receiving a block assignment, e.g., from a database or user interface such as user interface 842 discussed below with respect to FIG. 8.

In various embodiments, a circuit block includes equal numbers of PMOS and NMOS transistors, a greater number of PMOS transistors than NMOS transistors, or a greater number of NMOS transistors than PMOS transistors.

In some embodiments, assigning the first set of blocks to the first fin count includes analyzing, e.g., applying an algorithm to, the circuit to divide the circuit into blocks. Analyzing the circuit includes applying a set of criteria to the circuit based on one or more of circuit size, i.e., a total number of transistors, block definition, or inclusion in a signal path, logic gate, control portion, branch, or other functional arrangement. A non-limiting example of analyzing a circuit to divide the circuit into blocks is discussed below with respect to flip-flop circuit 400A and FIG. 4A.

In various embodiments, applying criteria based on circuit size includes using functional capabilities to determine the total number of transistors considered to be included in the circuit. In various embodiments, functional capabilities include performing one or more logic or mathematical functions, signal processing, timing, generation, selection, level-shifting, delay, or response functions, and/or one or more other suitable IC functions. Non-limiting examples of circuits having sizes based on functional capabilities include latches, flip-flops, e.g., flip-flip circuit 400A, addition circuits, e.g. adder circuit 500, selection circuits, e.g. MUX 600, level shifters, drivers, oscillators, voltage references, amplifiers, memory cells, and the like.

In some embodiments, a total number of transistors increases as functional capability increases. In some embodiments, determining the total number of transistors of the circuit includes the total number of transistors ranging from four to greater than 100. In some embodiments, determining the total number of transistors of the circuit includes the total number of transistors ranging from 16 to 96. In some embodiments, determining the total number of transistors of the circuit includes the total number of transistors ranging from 32 to 64.

In various embodiments, applying criteria based on block definition includes identifying transistors arranged to achieve a particular circuit function or sub-function, e.g., propagate, block, invert, isolate, and/or delay a signal, or enable or disable, e.g., power up or down, some or all of the circuit. In some embodiments, identifying transistors includes identifying pairs of PMOS and NMOS transistors.

In some embodiments, identifying the transistors includes identifying a number of transistors based on a target block size. In some embodiments, the target block size is based on a minimum number of transistors required to achieve the particular circuit function or sub-function, e.g., at least four transistors required to realize a tristate inverter or two transistors required to realize a transmission gate. In some embodiments, the target block size is based on layout considerations, e.g., two transistors targeted to achieve maximum layout flexibility in double height cells.

In various embodiments, applying criteria based on signal path inclusion includes identifying transistors included in a particular signal path, e.g., one signal path of multiple signal paths, and/or included in one or more predetermined portions of the particular signal path, e.g., a timing-critical location and/or feedback segment. In various embodiments, identifying transistors included in the particular signal path includes identifying a PMOS transistor, an NMOS transistor, or a pair of PMOS and NMOS transistors.

In various embodiments, applying criteria based on logic gate inclusion includes identifying transistors arranged to perform a specific logic function or sub-function, e.g., arranged as some or all of an inverter, AND, OR NAND, NOR, XOR, or other logic gate.

In various embodiments, applying criteria based on control portion inclusion includes identifying transistors arranged to perform a specific circuit control function, e.g., selectively enabling a portion or all of the circuit in response to one or more enable, control, or other signals.

In various embodiments, applying criteria based on branch inclusion includes identifying transistors arranged within a particular portion of the circuit, e.g., one of a plurality of selectable input paths.

In some embodiments, assigning the first set of blocks to the first fin count includes receiving block division information, e.g., from a database or user interface such as user interface 842 discussed below with respect to FIG. 8.

In some embodiments, assigning the first set of blocks to the first fin count includes performing a timing analysis of some or all of the circuit, e.g., identifying one or more critical high speed signal paths. In some embodiments, performing the timing analysis includes assigning timing criticality rankings to various circuit portions, e.g., a plurality of signal paths. In various embodiments, assigning the first set of blocks to the first fin count includes applying the timing analysis to determine inclusion of a particular block in the first set of blocks, e.g., either including or excluding the particular block based on the block being part of a particular signal path.

In various embodiments, the timing analysis is performed after dividing the circuit into blocks, the circuit is divided into blocks after performing the timing analysis, or the timing analysis and circuit block division are combined or iterated. In some embodiments, performing the timing analysis includes receiving timing information, e.g., from a database or user interface such as user interface 842 discussed below with respect to FIG. 8.

In various embodiments, performing the timing analysis includes analyzing timing of one or more transistors based on one or both of the first or second total number of fins. In some embodiments, performing the timing analysis includes analyzing timing of one or more transistors based on a number of fins other than the first and second total number of fins. In some embodiments, performing the timing analysis includes calculating one or more switching speeds of one or more transistors.

In some embodiments, assigning the first set of blocks to the first fin count includes assigning the first set of blocks independent of a timing analysis of the circuit, e.g., based on an indication of non-criticality of circuit speed in the timing information.

In some embodiments, assigning the first set of blocks to the first fin count includes performing a power analysis of some or all of the circuit, e.g., identifying one or more critical high power circuit portions. In some embodiments, performing the power analysis includes assigning power criticality rankings to various circuit portions, e.g., a plurality of signal paths. In various embodiments, assigning the first set of blocks to the first fin count includes applying the power analysis to determine inclusion of a particular block in the first set of blocks, e.g., either including or excluding the particular block based on the block being part of a particular signal path.

In various embodiments, the power analysis is performed after dividing the circuit into blocks, the circuit is divided into blocks after performing the power analysis, or the power analysis and circuit block division are combined or iterated.

In various embodiments, some or all of performing and/or applying the power analysis is combined with some or all of performing and/or applying the timing analysis. In various embodiments, some or all of performing and/or applying the power analysis and/or some or all of performing and/or applying the timing analysis are used to determine a block prioritization such that blocks are either included in or excluded from the first set of blocks based on the block prioritization, in some embodiments combined with other factors, e.g., area efficiency levels as discussed below.

In some embodiments, assigning the first set of blocks to the first fin count includes calculating a power level of the first set of blocks based on the first fin count. Calculating a power level, e.g., the power level of the first set of blocks, includes the power level varying with respect to a fin count, e.g., the first fin count, such that the power level increases with increasing fin count values.

In various embodiments, calculating a power level, includes executing a set of software instructions, e.g., a circuit or device simulation program, to calculate one or more of a direct current (DC) and/or alternating current (AC) on-state current level, one or more off-state leakage levels, and/or another circuit parameter related to circuit power, based on power information, e.g., one or more operating voltage levels, frequencies, and/or temperatures. In some embodiments, calculating the power level includes the power level being based on proximity of various transistors, blocks, or other features within a circuit layout, and/or one or more additional factors related to circuit. In some embodiments, calculating the power level includes the power level being based on a circuit layout, e.g., as a result of executing operation 340 discussed below.

In some embodiments, calculating the power level of the first set of blocks includes receiving the power information, e.g., from a database or user interface such as user interface 842 discussed below with respect to FIG. 8.

In some embodiments, assigning the first set of blocks to the first fin count includes adding at least one block to an existing first set of blocks and/or removing at least one block from an existing first set of blocks, e.g., in response to performing one or more of operations 312, 322, or 332 discussed below.

At operation 312, in some embodiments, a speed level V of the circuit is calculated based on the first set of blocks being assigned to the first fin count, and speed level V is compared to a threshold speed level Vth. In various embodiments, calculating speed level V includes executing a set of software instructions, e.g., a circuit or device simulation program, to calculate one or more of a transistor switching speed, a circuit block setup time, a frequency response, a bandwidth, and/or another circuit parameter related to transistor speed.

Calculating speed level V based on the first set of blocks being assigned to the first fin count includes speed level V varying with respect to one or both of the first or second total numbers of fins of the first fin count such that speed level V increases with respect to increasing first fin count values. Speed level V varying with respect to one or both of the first or second total numbers of fins corresponds to speed level V being based on the one of the at least one PMOS transistor or at least one NMOS transistor corresponding to the first total number of fins and/or the other of the at least one PMOS transistor or at least one NMOS transistor corresponding to the second total number of fins.

In various embodiments, calculating speed level V includes speed level V being based on all or a subset of the first set of blocks, a subset of transistors within a given block, a hierarchical ranking of the blocks or transistors within a given block, proximity of various transistors, blocks, or other features within a circuit layout, and/or one or more additional factors related to circuit speed.

In various embodiments, calculating speed level V includes speed level V being based on all, some, or none of the circuit blocks not in the first set of blocks, e.g., a second set of blocks pre-assigned or assigned to the second fin count, e.g., as a result of executing operation 320 discussed below. In some embodiments, calculating speed level V includes speed level V being based on a circuit layout, e.g., as a result of executing operation 340 discussed below.

In various embodiments, calculating speed level V includes performing a summation, an algebraic combination, and/or a slowest speed identification of one or more speeds corresponding to individual blocks of the first and/or second set of blocks.

In some embodiments, comparing speed level V to threshold speed level Vth includes threshold speed level Vth being a performance specification based on an application of the circuit. In some embodiments, comparing speed level V to threshold speed level Vth includes receiving threshold speed level Vth, e.g., from a database or user interface such as user interface 842 discussed below with respect to FIG. 8.

In some embodiments, operation 314 is executed based on speed level V being equal to or greater than threshold speed level Vth, and operation 320 is executed based on speed level V being below threshold speed level Vth.

At operation 314, in some embodiments, based on speed level V being below threshold speed level Vth, one or more additional circuit blocks are assigned to the first fin count by returning to operation 310. In various embodiments, assigning the one or more additional blocks to the first fin count is based on applying a previously determined block prioritization, performing further timing analysis, and/or receiving assignment information, e.g., from a database or user interface such as user interface 842 discussed below with respect to FIG. 8.

At operation 320, in some embodiments, a second set of blocks of the circuit is assigned to a second fin count lower than the first fin count. Assigning the second set of blocks to the second fin count includes assigning at least one circuit block including at least one PMOS transistor and at least one NMOS transistor. The second fin count is a sum of a third total number of fins corresponding to one of the at least one PMOS transistor or at least one NMOS transistor and a fourth total number of fins corresponding to the other of the at least one PMOS transistor or at least one NMOS transistor.

In some embodiments, assigning the second set of blocks to the second fin count includes the second fin count being less than or equal to four. In various embodiments, assigning the second set of blocks to the second fin count includes the third total number of fins being equal to the fourth total number of fins or the third total number of fins being different from the fourth total number of fins. In various embodiments, assigning the second set of blocks to the second fin count includes one or both of the third or fourth total numbers of fins being equal to one or two. In some embodiments, assigning the second set of blocks to the second fin count includes assigning the second set of blocks to block region BL2 including active region AR3 corresponding to the third total number of fins and active region AR4 corresponding to the fourth total number of fins as discussed above with respect to FIGS. 1 and 2.

In some embodiments, assigning the second set of blocks to the second fin count includes receiving the second set of blocks pre-assigned to the second fin count, e.g., from a cell library. In some embodiments, assigning the second set of blocks to the second fin count includes receiving a block assignment, e.g., from a database or user interface such as user interface 842 discussed below with respect to FIG. 8.

In some embodiments, assigning the second set of blocks to the second fin count includes identifying one or more blocks based on a timing analysis, e.g., the timing analysis performed in operation 310. In some embodiments, assigning the second set of blocks to the second fin count includes assigning one or more blocks based on one or more block functions, e.g., a biasing, power up/down, or sleep mode function, independent of one or more operational activities of the circuit.

In some embodiments, assigning the second set of blocks to the second fin count includes calculating a power level of the second set of blocks based on the second fin count, as discussed above with respect to operation 310. In some embodiments, calculating the power level of the second set of blocks includes calculating the power level of the first set of blocks based on the first fin count.

In various embodiments, calculating the power level of the second set of blocks includes receiving the power information, e.g., from a database or user interface such as user interface 842 discussed below with respect to FIG. 8. In some embodiments, assigning the first set of blocks to the first fin count in operation 310 and assigning the second set of blocks to the second fin count in operation 320 includes assigning the first and second sets of blocks independent of calculating a power level of the first and second sets of blocks, e.g., based on an indication of non-criticality of circuit power in the power information.

At operation 322, in some embodiments, a circuit power level P is calculated as a sum of the power level of the first set of blocks based on the first fin count and the power level of the second set of blocks based on the second fin count, and circuit power level P is compared to a threshold power level Pth. Calculating the power levels of the first set of blocks based on the first fin count and the second set of blocks based on the second fin count are discussed above with respect to operations 310 and 320.

In some embodiments, comparing power level P to threshold power level Pth includes threshold power level Pth being a performance specification based on an application of the circuit, e.g., a power budget of an overall circuit design. In some embodiments, comparing power level P to threshold power level Pth includes receiving threshold power level Pth, e.g., from a database or user interface such as user interface 842 discussed below with respect to FIG. 8.

In some embodiments, operation 324 is executed based on power level P exceeding threshold power level Pth, and operation 330 is executed based on power level P being equal to or exceeding threshold power level Pth.

At operation 324, in some embodiments, based on circuit power level P exceeding threshold power level Pth, a block of the first set of blocks is reassigned to the second fin count. In various embodiments, reassigning the block of the first set of blocks to the second fin count includes returning to one of operations 310 or 320. In various embodiments, reassigning the block to the second fin count is based on applying a previously determined block prioritization, performing further timing analysis, and/or receiving assignment information, e.g., from a database or user interface such as user interface 842 discussed below with respect to FIG. 8.

At operation 330, in some embodiments, an area efficiency level EL is calculated based on the first set of blocks being assigned to the first fin count and the second set of blocks being assigned to the second fin count. In some embodiments, calculating efficiency level EL includes calculating an efficiency ratio based on a total number of transistors X in the first set of blocks and a total number of transistors Y in the second set of blocks. In some embodiments, efficiency level EL is given by $$EL=(X+Y)/(2\times\max(X,Y)) \quad (1)$$

such that a maximum value of efficiency level EL equal to one corresponds to total number of transistors X being equal to total number of transistors Y.

In various embodiments, efficiency level EL is equal to one of ratios X/Y or Y/X such that total number of transistors X being equal to total number of transistors Y corresponds to a value of efficiency level EL being equal to one.

At operation 332, in some embodiments, area efficiency level EL is compared to an area efficiency limit. In various embodiments, comparing area efficiency level EL to the area efficiency limit includes the area efficiency limit being a value above and/or below one. In some embodiments, comparing area efficiency level EL to the area efficiency limit includes the area efficiency limit being 0.7 and/or 1.3.

In some embodiments, comparing area efficiency level EL to the area efficiency limit includes comparing area efficiency level EL to a predetermined manufacturing limit. In some embodiments, comparing area efficiency level EL to the area efficiency limit includes receiving the area efficiency limit, e.g., from a database or user interface such as user interface 842 discussed below with respect to FIG. 8.

In some embodiments, operation 334 is executed based on area efficiency level EL being outside the area efficiency limit, and operation 340 is executed based on area efficiency level EL being at or within the area efficiency limit.

At operation 334, in some embodiments, based on area efficiency level EL being outside the area efficiency limit, the fin count assignments are rebalanced by at least one of reassigning a block of the second set of blocks to the first fin count or reassigning a block of the first set of blocks to the second fin count. In various embodiments, rebalancing the fin count assignments includes returning to one of operations 310 or 330. In various embodiments, rebalancing the fin count assignments is based on applying a previously determined block prioritization, performing further timing analysis, and/or receiving assignment information, e.g., from a database or user interface such as user interface 842 discussed below with respect to FIG. 8.

At operation 340, the first and second sets of blocks are arranged based on the respective first and second fin counts. Arranging the first set of blocks includes using first and second active regions of a first block region of an IC layout cell, the first and second active regions collectively corresponding to a plurality of fins having the first fin count. Arranging the second set of blocks includes using third and fourth active regions of a second block region of the IC layout cell, the third and fourth active regions collectively corresponding to a plurality of fins having the second fin count.

In various embodiments, arranging the first and second sets of blocks includes using the first and fourth active regions corresponding to PMOS transistors and the second and third active regions corresponding to NMOS transistors, or using the first and fourth active regions corresponding to NMOS transistors and the second and third active regions corresponding to PMOS transistors.

Arranging the first set of blocks in the first block region and the second set of blocks in the second block region includes determining relative proximities of the various blocks to each other. In some embodiments, arranging the first set of blocks in the first block region and the second set of blocks in the second block region includes selecting one arrangement of a plurality of possible arrangements such that the relative proximities of the various blocks to each other is arbitrary.

In some embodiments, determining the relative proximities of the various blocks to each other includes determining the relative proximities based on a set of one or more criteria. In various embodiments, criteria include at least one of circuit speed based on proximity of a given block to another block or external circuit, power dissipation of a given block relative to power dissipation of one or more proximate features, ease of routing between blocks and/or to an external circuit, or design considerations such as minimizing numbers of cut poly regions or the like.

In various embodiments, arranging the first and second sets of blocks using first through fourth active regions includes executing one or more of operations 110-170 of method 100, thereby generating IC layout diagram 200 including active regions AR1 and AR2 of block region BL1 and active regions AR3 and AR4 of block region BL2 of cell 200C, as discussed above with respect to FIGS. 1 and 2.

In various embodiments, arranging the first and second sets of blocks using first through fourth active regions includes arranging blocks A-J using active regions AR1-AR4 of cells 400CC, 400EC, and 400GC, as discussed below with respect to FIGS. 4C, 4E, and 4G.

In some embodiments, arranging the first and second sets of blocks includes executing one or more of operations 170-190 of method 100, e.g., thereby storing the IC layout diagram and/or performing an additional operation based on the IC layout diagram, as discussed above with respect to FIGS. 1 and 2.

By executing some or all of the operations of method 300, an IC layout diagram, e.g., one of IC layout diagrams 200, 400C, 400E, or 400G, is generated in which circuit blocks are assigned such that transistors are distributed among relatively high and low fin counts, thereby realizing the benefits discussed above with respect to method 100 and IC layout diagram 200, and as further discussed below with respect to FIGS. 4A-6.

In the non-limiting example illustrated in FIG. 4A, flip-flop circuit 400A includes input terminals configured to receive control signals SI and SE, data DI, and clock signal CP, power supply nodes configured to receive a power supply voltage level VDD and a reference voltage level VSS, and an output terminal configured to output signal QO. Inverters are configured to generate an internal control signal seb from control signal SE and internal clock signals clkb and clkbb from clock signal CP.

Based on execution of operation 310, flip-flop circuit 400A is divided into ten blocks as listed in Table 1 and discussed below.

TABLE 1

| Block | Function |
|---|---|
| A | Clock |
| B | Clock |
| C | MUX 1 |
| D | MUX 2 |
| E | Data Input |
| F | Master Feedback Path |
| G | Master Forward Path |
| H | Slave Feedback Path |
| I | Slave Forward Path |
| J | Buffer |

By applying criteria based on functional capabilities of a flip-flop circuit, i.e., outputting signal QO in response to control signals SI and SE, data DI, and clock signal CP, flip-flop circuit 400A includes a total of 32 transistors arranged as 16 pairs of PMOS and NMOS transistors and configured as depicted in FIG. 4A.

By applying criteria based on defining a block by identifying transistors arranged as inverters and based on inclusion in a clock signal path, flip-flop circuit 400A is partially divided into blocks A and B, each including a transistor pair arranged as an inverter in the path along which clock signal CP is received and sequentially inverted to generate internal clock signals clkb and clkbb.

By applying criteria based on defining a block by identifying transistors arranged as inverters and based on inclusion in a selection control portion, flip-flop circuit 400A is further divided into block C including a transistor pair arranged as an inverter configured to generate internal control signal seb usable in a selection function along with control signal SE.

By applying criteria based on further identifying transistors included in the selection control portion, flip-flop circuit 400A is further divided into block D including two PMOS and two NMOS transistors configured to perform the selection function in response to control signals SE and SI and internal control signal seb.

By applying criteria based on defining a block by identifying transistors arranged to perform a data input function, flip-flop circuit 400A is further divided into block E including two PMOS transistors in a first segment E and two NMOS transistors in a second segment E', the four transistors being configured to selectively input data DI in response to control signal SE and internal control signal seb.

By applying criteria based on identifying transistors included in a master latch feedback signal path, flip-flop circuit 400A is further divided into block F including a transistor pair in a first segment F and two PMOS and two NMOS transistors in a second segment F', the six transistors being configured to provide the master latch feedback signal path having timing controlled by internal clock signals clkb and clkbb.

By applying criteria based on defining a block by identifying transistors arranged as inverters and based on identifying transistors included in a master latch forward signal path, flip-flop circuit 400A is further divided into block G including a transistor pair arranged as an inverter and included in the master latch forward signal path.

By applying criteria based on identifying transistors included in a slave latch feedback signal path, flip-flop circuit 400A is further divided into block H including a transistor pair arranged as a transmission gate in a first segment H and two PMOS and two NMOS transistors in a second segment H', the six transistors being configured to provide the slave latch feedback signal path having timing controlled by internal clock signals clkb and clkbb.

By applying criteria based on defining a block by identifying transistors arranged as inverters and based on identifying transistors included in a slave latch forward signal path, flip-flop circuit 400A is further divided into block I including a transistor pair arranged as an inverter and included in the slave latch forward signal path.

By applying criteria based on defining a block by identifying transistors arranged as inverters and based on identifying transistors included in an output buffer portion, flip-flop circuit 400A is further divided into block J including a transistor pair arranged as an inverter configured to output signal QO.

As depicted in FIGS. 4A, 4B, 4D, and 4F, flip-flop circuit 400A is thereby divided into blocks A, B, C, G, I, and J including a single inverter, block D including two PMOS transistors and two NMOS transistors, block E including two PMOS transistors in the first segment E and two NMOS transistors in the second segment E', block F including an inverter in the first segment F and a gated inverter in the second segment F', and block H including a transmission gate in the first segment H and a gated inverter in the second segment H'.

In flip-flop circuit 400A, each of the master latch forward signal path, mater latch feedback signal path, and slave latch feedback path is a critical high speed signal path such that each of blocks F-H corresponds to a critical high speed signal path. Based on design criteria corresponding to operating frequencies, data activity, and current levels related to gate and other parasitic capacitance levels, each of blocks F-H also corresponds to a high power level relative to power levels of circuit blocks A-E and J.

By executing some or all of operations 310-334, first and second sets of blocks A-J of flip-flop circuit 400A are assigned to either a first fin count FC1 or a second fin count FC2 lower than first fin count FC1, respectively, such that speed and power requirements are addressed as needed, as illustrated by the non-limiting examples discussed below.

Figure 4B:
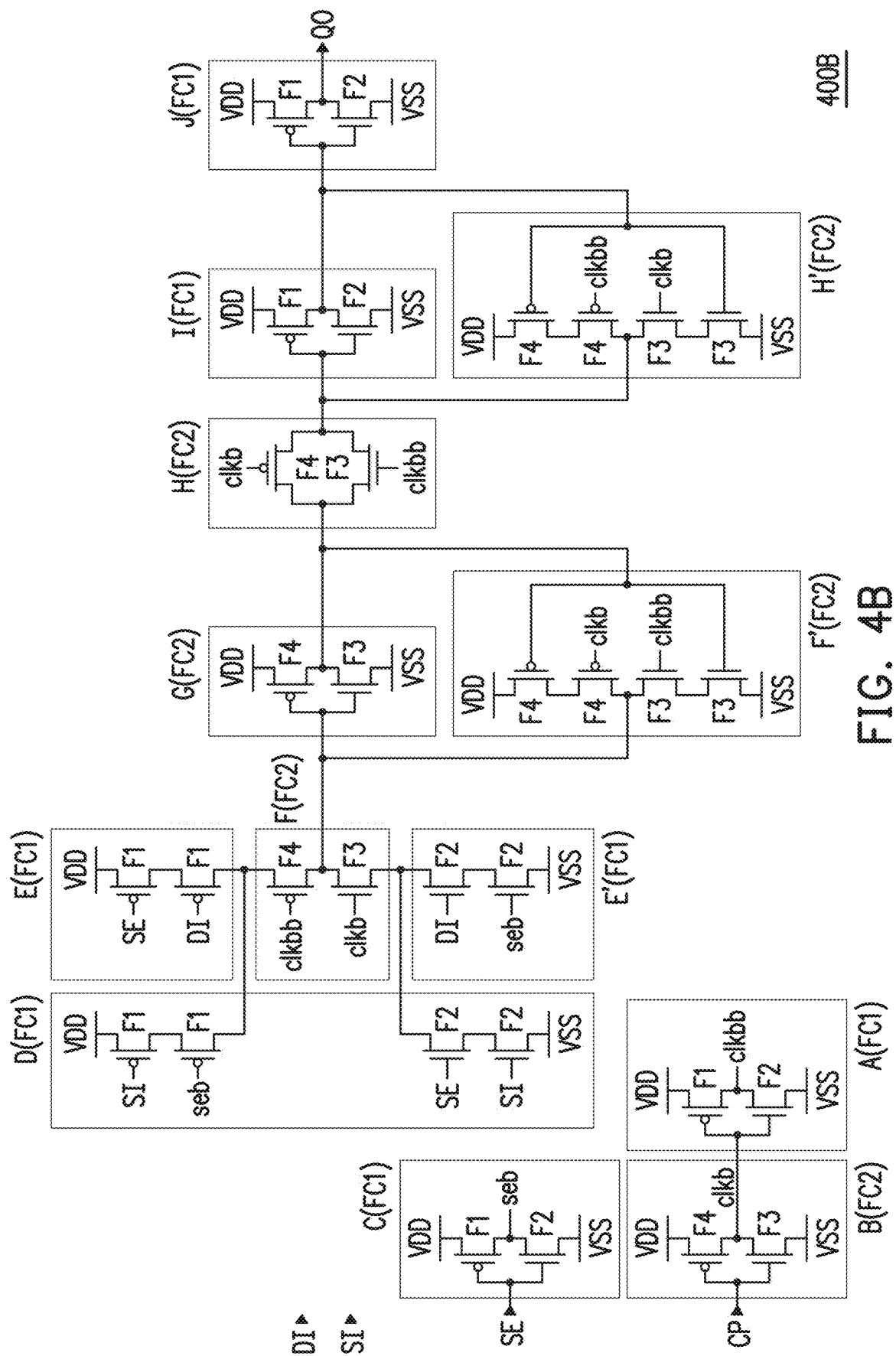
Figure 4C:
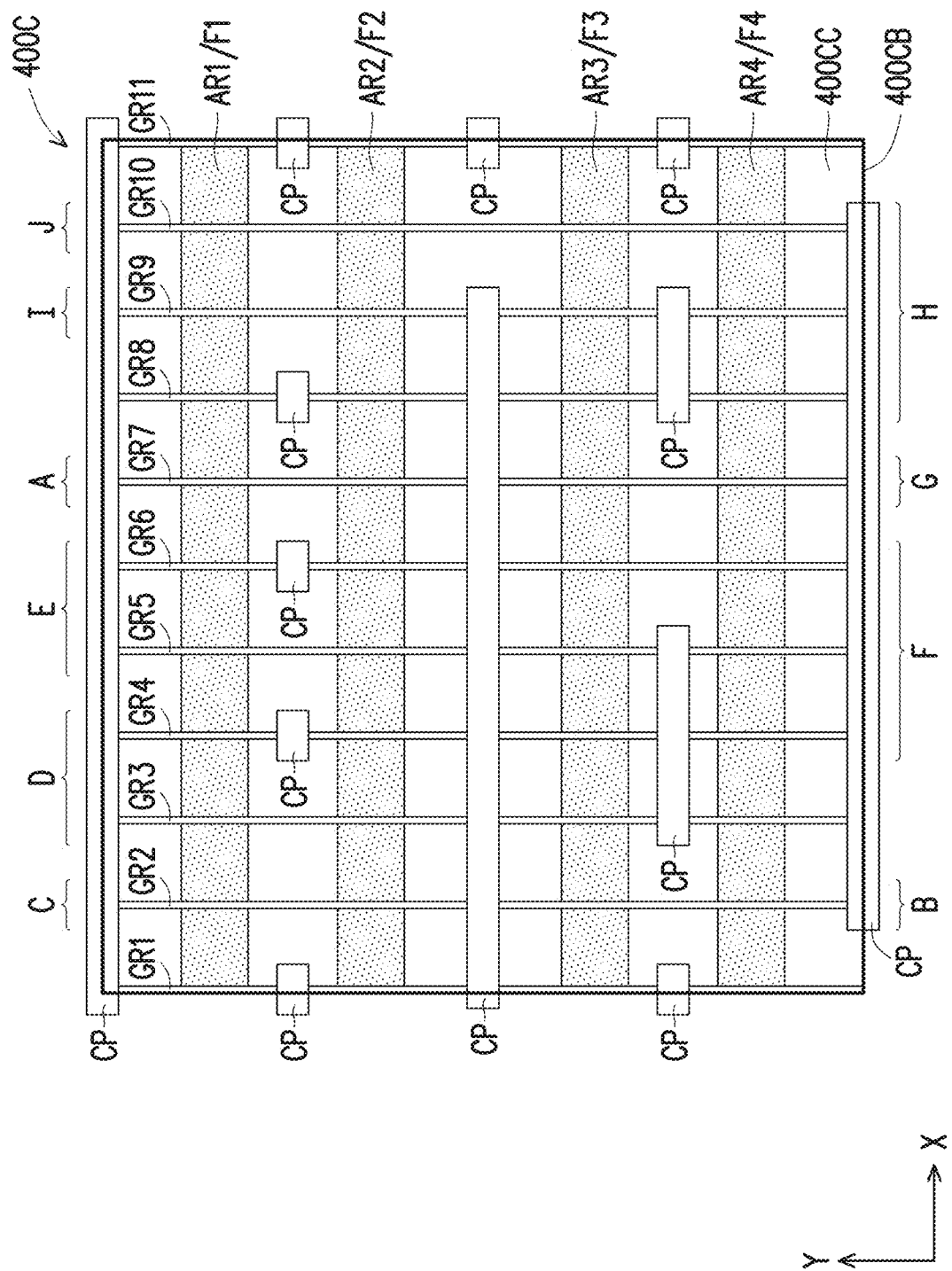
Figure 4D:
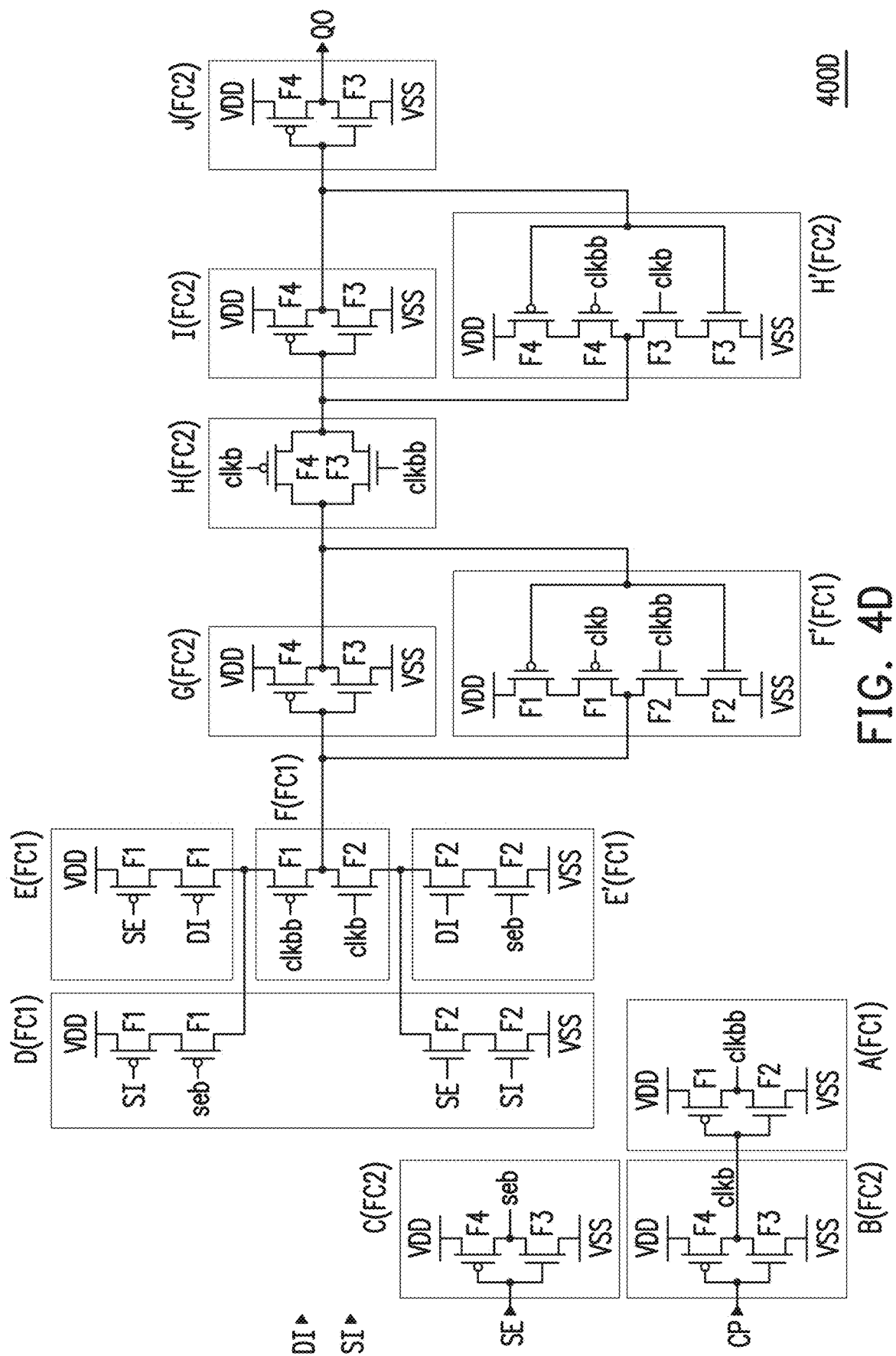
Figure 4E:
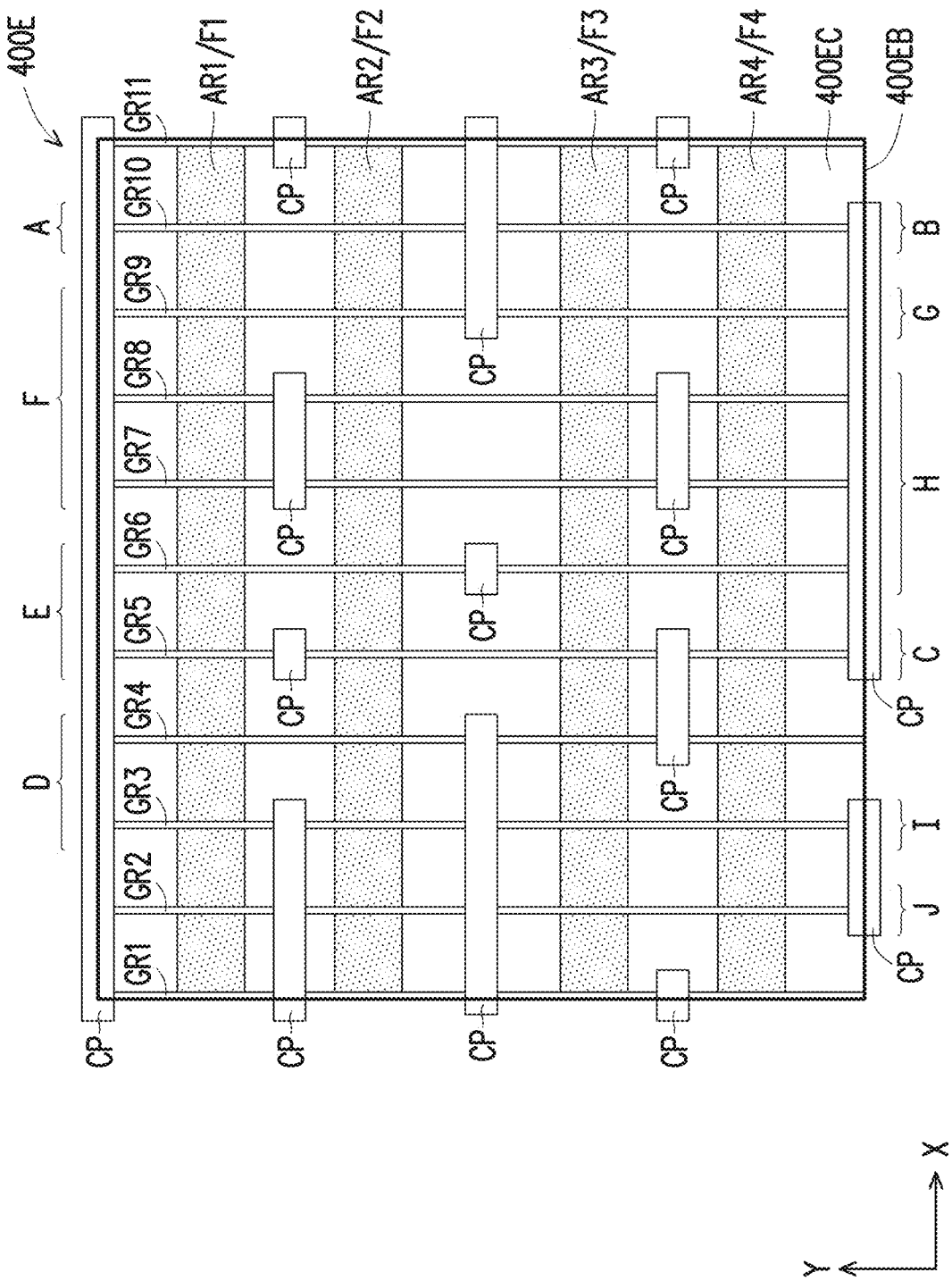

In the embodiments depicted in FIGS. 4B, 4D, and 4E, flip-flop circuits 400B, 400D, and 400F include first fin count FC1 as a sum of a first total number of fins F1 corresponding to PMOS transistors and a second total number of fins F2 corresponding to NMOS transistors, and second fin count FC2 as a sum of a third total number of fins F3 corresponding to NMOS transistors and a fourth total number of fins F4 corresponding to PMOS transistors. In some embodiments, first and fourth total numbers of fins F1 and F4 correspond to NMOS transistors and second and third total numbers of fins F2 and F3 correspond to PMOS transistors.

In the first non-limiting example depicted in FIG. 4B, flip-flop circuit 400A is configured as flip-flop circuit 400B based on circuit speed being a non-critical requirement, thereby corresponding to a case in which the circuit power level is minimized. Accordingly, each of blocks A, C, D, E, I, and J is assigned to first fin count FC1 based on the low power levels relative to blocks F-H, and each of blocks B, F, G, and H is assigned to second fin count FC2 based on the relatively high power levels. Because circuit speed is not critical and power levels increase with increasing fin counts, an overall power level of flip-flop circuit 400B is minimized by the block assignments.

In various embodiments, assigning blocks A, C, D, E, I, and J to first fin count FC1 and blocks B, F, G, and H to second fin count FC2 includes executing various subsets or all of operations 310-334. In some embodiments, blocks A, C, D, E, I, and J are assigned to first fin count FC1 in operation 310, operation 312 is not executed, blocks B, F, G, and H are assigned to second fin count FC2 in operation 320, power level P is calculated and confirmed to be equal to or below threshold power level Pth in operation 322, and area efficiency level EL is calculated in operation 330.

In some embodiments, one or more blocks other than blocks A, C, D, E, I, and J are assigned to first fin count FC1 in operation 310, the remaining blocks are assigned to second fin count FC2 in operation 320, power level P is calculated and determined to exceed threshold power level Pth in operation 322, and one or more of blocks A, C, D, E, I, or J is reassigned to first fin count FC1 in operation 324.

In some embodiments, based on blocks A, C, D, E, I, and J being assigned to first fin count FC1 and blocks B, F, G, and H being assigned to second fin count FC2, area efficiency level EL is calculated in operation 330 and confirmed to be at or within the predetermined limit based on each of total number of transistors X and total number of transistors Y being equal to 16.

In some embodiments, based on one or more blocks other than blocks A, C, D, E, I, and J being assigned to first fin count FC1 and one or more blocks other than blocks B, F, G, and H being assigned to second fin count FC2, area efficiency level EL is calculated in operation 330 and determined to be outside the predetermined limit based on total numbers of transistors X and Y being equal to values other than 16, and the block assignments are rebalanced in operation 334.

In the second non-limiting example depicted in FIG. 4D, flip-flop circuit 400A is configured as flip-flop circuit 400D based on each of circuit speed and circuit power being a critical requirement, thereby corresponding to a case in which a tradeoff between circuit speed and power is achieved. Accordingly, each of blocks A and D-F is assigned to first fin count FC1 and each of blocks B, C, and G-J is assigned to second fin count FC2. Based on the relatively high power level and speed criticality of block F assigned to first fin count FC1 and of blocks G and H assigned to second fin count FC2, overall circuit speed and power levels of flip-flop circuit 400D are balanced by the block assignments.

Similar to the example discussed above with respect to FIG. 4B, in various embodiments, assigning blocks A and D-F to first fin count FC1 and blocks B, C, and G-J to second fin count FC2 includes executing various subsets or all of operations 310-334.

For example, in some embodiments, one or more blocks other than blocks A and D-F are assigned to first fin count FC1 in operation 310, speed level V is calculated and determined to be below threshold speed level Vth in operation 312, and one or more of blocks B, C, or G-J is reassigned to first fin count FC1 in operation 314.

Figure 4F:
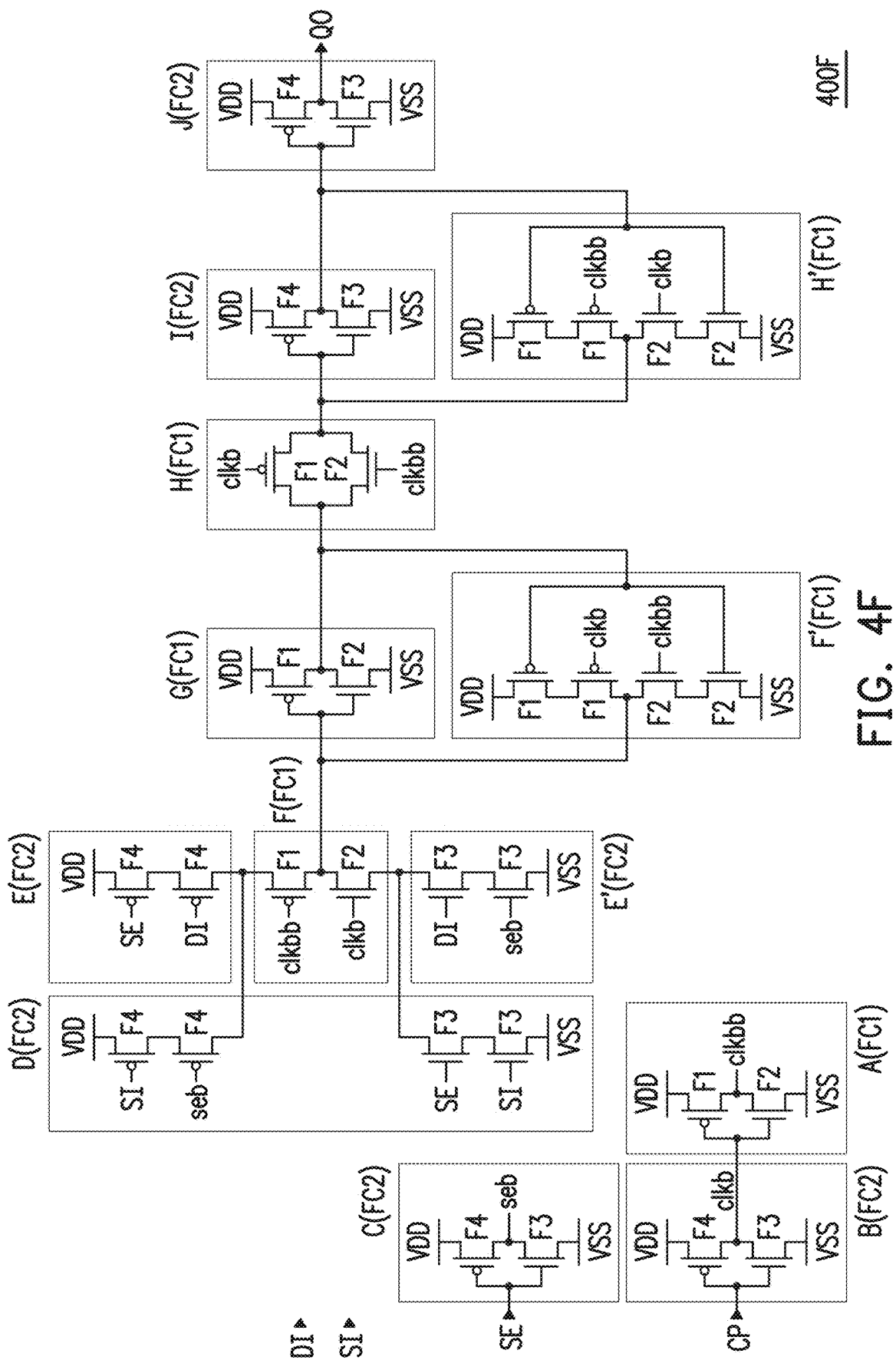

In the third non-limiting example depicted in FIG. 4F, flip-flop circuit 400A is configured as flip-flop circuit 400F based on circuit power being a non-critical requirement, thereby corresponding to a case in which the circuit speed level is maximized. Accordingly, each of blocks A and F-H is assigned to first fin count FC1 based on the relatively high speed criticality of circuit blocks F-H and each of blocks B-E, I, and J is assigned to second fin count FC2 based on the relatively low speed criticality. Because circuit power is not critical and speed levels increase with increasing fin counts, an overall speed level of flip-flop circuit 400F is maximized by the block assignments.

Similar to the examples discussed above with respect to FIGS. 4B and 4D, in various embodiments, assigning blocks A and F-H to first fin count FC1 and blocks B-E, I, and J to second fin count FC2 includes executing various subsets or all of operations 310-334.

Based on the configurations discussed above, flip-flop circuits 400B, 400D, and 400F have relative circuit speed and power levels as represented in Table 2 below.

TABLE 2

| Circuit | Speed | Power |
| --- | --- | --- |
| 400B | Slow | Low |
| 400D | Medium | Medium |
| 400F | Fast | High |

As illustrated in Table 2, based on the circuit block assignments, flip-flop circuit 400B has a slow speed level and low power level relative to flip-flop circuits 400D and 400F, flip-flop circuit 400D has medium speed and power levels relative to flip-flop circuits 400B and 400F, and flip-flop circuit 400F has a fast speed level and high power level relative to flip-flop circuits 400B and 400D.

Figure 4G:
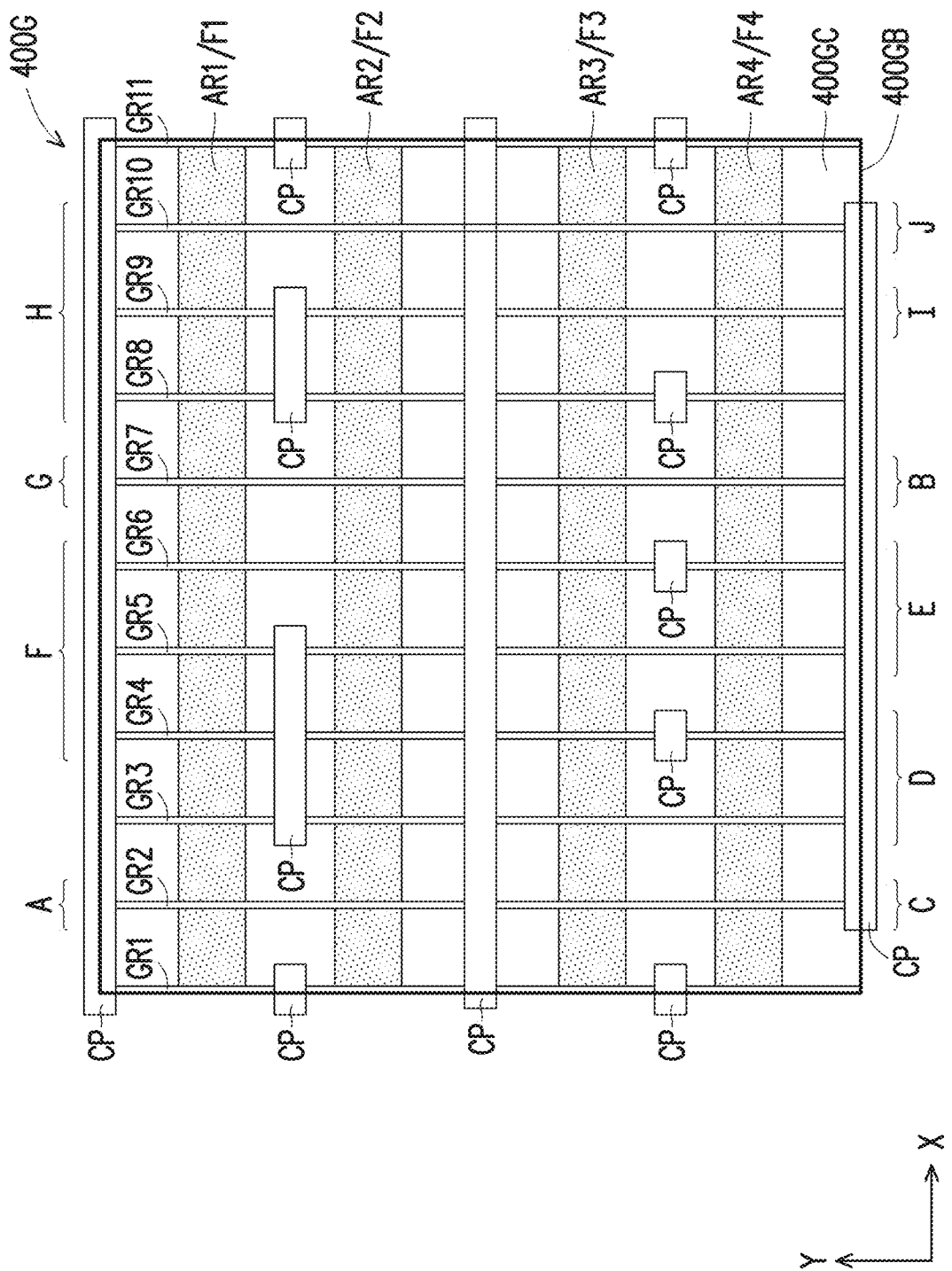

Based on execution of operation 340, flip-flop circuits 400B, 400D, and 400G are used to generate IC layout diagrams 400C, 400E, and 400G depicted in FIGS. 4C, 4E, and 4G, respectively, in accordance with some embodiments. Each of IC layout diagrams 400C, 400E, and 400F includes active regions AR1-AR4, gate regions GR1-GR3, and multiple instances of cut poly regions CP, discussed above with respect to FIGS. 1 and 2, and additional gate regions GR4-GR11, similar to gate regions GR1-GR3. Active region AR1 corresponds to first total number of fins F1, active region AR2 corresponds to second total number of fins F2, active region AR3 corresponds to third total number of fins F3, and active region AR4 corresponds to fourth total number of fins F4.

IC layout diagram 400C includes cell 400CC having a border 400CB, IC layout diagram 400E includes cell 400EC having a border 400EB, and IC layout diagram 400G includes cell 400GC having a border 400GB. Each of cells 400CC, 400EC, and 400GC includes the multiple instances of cut poly region CP arranged in accordance with blocks A-J which represent both instances of block regions BL1 and BL2 discussed above with respect to FIGS. 1 and 2, and the circuit blocks assigned in accordance with the configurations of respective flip-flop circuits 400B, 400D, and 400F.

As illustrated by the non-limiting examples of flip-flop circuits 400B, 400D, and 400F and respective IC layout diagrams 400C, 400E, and 400G, multiple circuit configurations produced by performing some or all of the operations of method 300 enable options by which tradeoffs between speed and power are selectable. In the options represented by flip-flop circuits 400B, 400D, and 400F and respective IC layout diagrams 400C, 400E, and 400G, overall circuit area is not affected because each configuration includes a total number of transistors X in the first set of blocks equal to sixteen and a total number of transistors Y in the second set of blocks equal to sixteen. Each of flip-flop circuits 400B, 400D, and 400F and respective IC layout diagrams 400C, 400E, and 400G thereby corresponds to an area efficiency level EL equal to one when calculated in accordance with the embodiments discussed above.

Figure 4H:
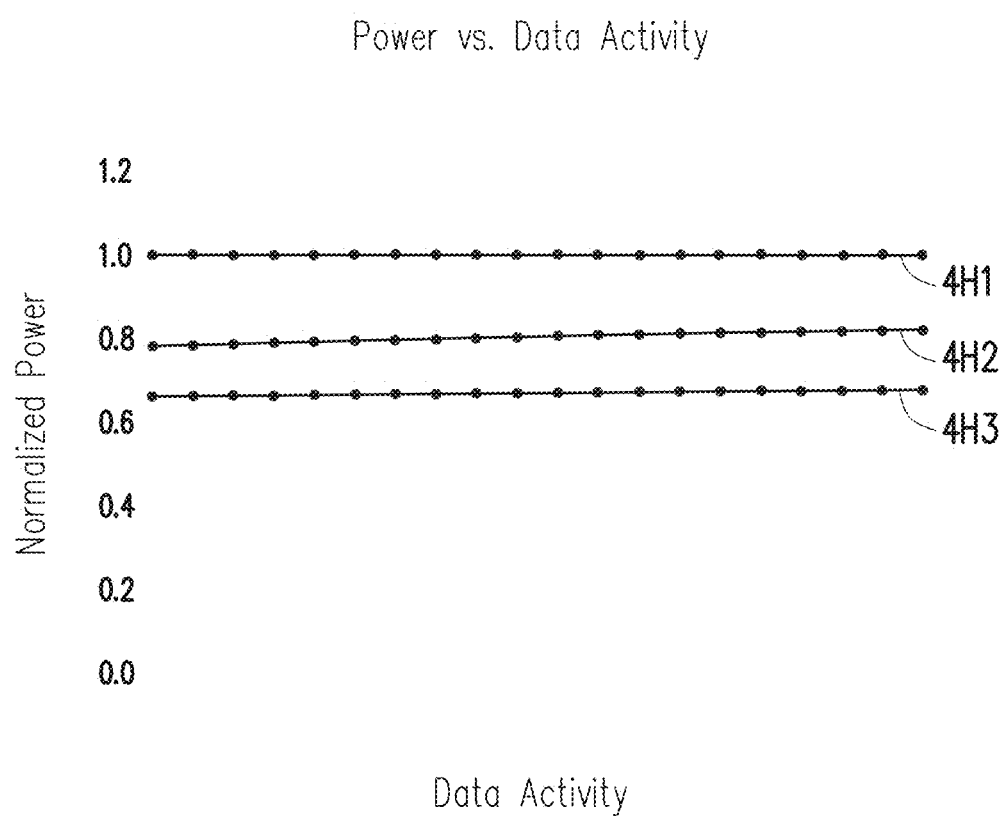
Figure 4I:
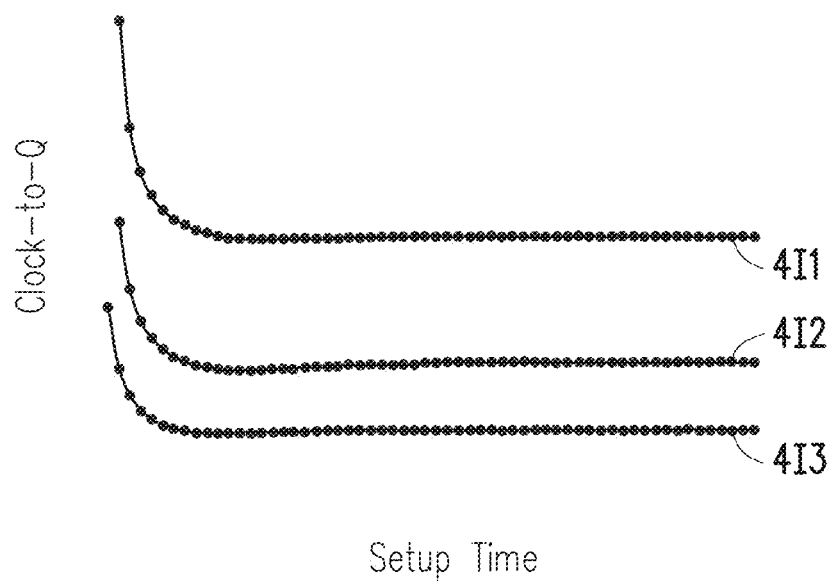

Each of FIGS. 4H and 4I depicts a comparison between a given one of flip-flop circuits 400B, 400D, or 400F corresponding to respective IC layout diagrams 400C, 400E, and 400G, and flip-flop circuits configured other than by performing some or all of the operations of method 300.

FIG. 4H depicts normalized power as a function of data activity and includes curves 4H1-4H3. Curve 4H1 represents a flip-flop circuit in which all transistors correspond to first fin count FC1, curve 4H2 represents a given one of flip-flop circuits 400B, 400D, or 400F, and curve 4H3 represents a flip-flop circuit in which all transistors correspond to the second fin count FC2. As illustrated in FIG. 4H, the given one of flip-flop circuits 400B, 400D, or 400F has power level P between the other power levels for an entire range of data activity levels.

FIG. 4I depicts timing characteristics (clock-to-Q versus setup time) and includes curves 4I1-4I3. Curve 4I1 represents a flip-flop circuit in which all transistors correspond to first fin count FC1, curve 4I2 represents a given one of flip-flop circuits 400B, 400D, or 400F, and curve 4I3 represents a flip-flop circuit in which all transistors correspond to the second fin count FC2. As illustrated in FIG. 4I, the given one of flip-flop circuits 400B, 400D, or 400F has timing characteristics between those of the other flip-flop circuits.

As illustrated in the non-limiting examples depicted in FIGS. 4H and 4I, a circuit configured by executing some or all of the operations of method 300 is capable of having power and timing characteristics consistent with those of circuits configured without executing some or all of the operations of method 300, while enabling the benefits discussed above.

Additional non-limiting examples of circuits configured by executing some or all of the operations of method 300, and thereby being capable of having the benefits discussed above, are illustrated in FIGS. 5 and 6 discussed below.

FIG. 5 depicts an adder circuit 500, in accordance with some embodiments, and FIG. 6 depicts a MUX circuit 600, in accordance with some embodiments. Each of adder circuit 500 and MUX circuit 600 includes power supply nodes configured to receive power supply voltage VDD and reference voltage VSS, each discussed above with respect to FIG. 4A.

Adder circuit 500 includes input terminals configured to receive signals B1, B2, and C1, and terminals configured to output signals S and CO. Based on execution of operation 310, adder circuit 500 is divided into a block K including five PMOS transistors and five NMOS transistors arranged as a first functional portion, a block L including a transistor pair arranged as an inverter, and a block M including eight PMOS transistors and five NMOS transistors arranged as a second functional portion.

Based on execution of some or all of operations 312-334 in the manner discussed above with respect to FIGS. 4B, 4D, and 4G, blocks K and L are assigned to first fin count FC1, and block M is assigned to fin count FC2. In the embodiment depicted in FIG. 5, adder circuit 500 includes first fin count FC1 as a sum of first total number of fins F1 corresponding to PMOS transistors and second total number of fins F2 corresponding to NMOS transistors, and second fin count FC2 as a sum of third total number of fins F3 corresponding to NMOS transistors and fourth total number of fins F4 corresponding to PMOS transistors. In some embodiments, first and fourth total numbers of fins F1 and F4 correspond to NMOS transistors and second and third total numbers of fins F2 and F3 correspond to PMOS transistors.

MUX circuit 600 includes input terminals configured to receive signals I0-I3, S0, and S1, and a terminal configured to output signal ZO. Based on execution of operation 310, MUX circuit 600 is divided into a block N including two transistor pairs arranged as inverters configured to generate an internal signal s0b based on signal S0 and an internal signal s1b based on signal S1, a block O including five PMOS transistors and five NMOS transistors arranged as two gated inverters and a transmission gate, a block Q including five PMOS transistors and five NMOS transistors arranged as two gated inverters and a transmission gate, and a block R including a transistor pair arranged as an inverter.

Based on execution of some or all of operations 312-334 in the manner discussed above with respect to FIGS. 4B, 4D, and 4G, blocks O and R are assigned to first fin count FC1, and blocks N and Q are assigned to fin count FC2. In the embodiment depicted in FIG. 6, MUX circuit 600 includes first fin count FC1 as a sum of first total number of fins F1 corresponding to NMOS transistors and second total number of fins F2 corresponding to PMOS transistors, and second fin count FC2 as a sum of third total number of fins F3 corresponding to PMOS transistors and fourth total number of fins F4 corresponding to NMOS transistors. In some embodiments, first and fourth total numbers of fins F1 and F4 correspond to PMOS transistors and second and third total numbers of fins F2 and F3 correspond to NMOS transistors.

Figure 7:
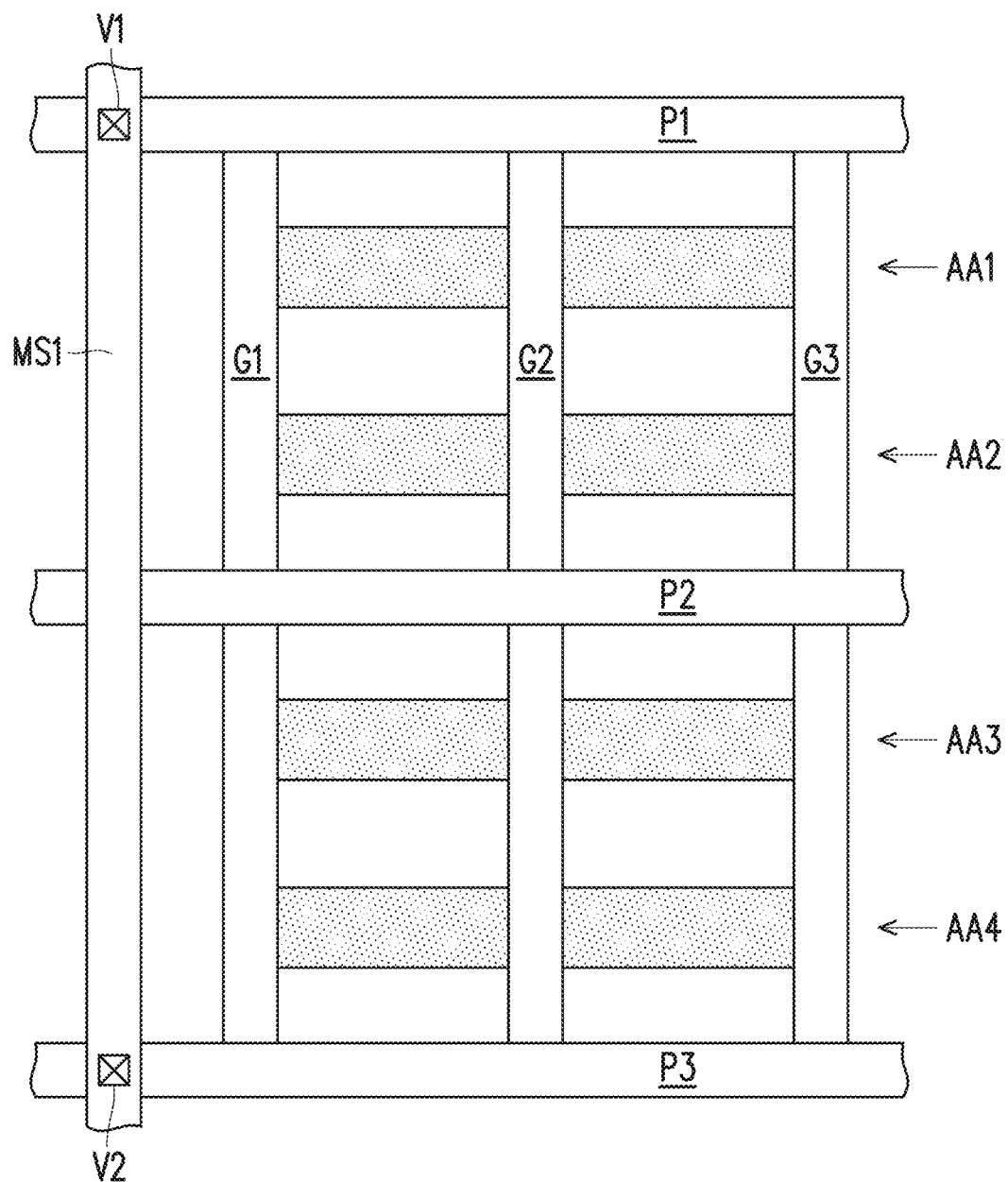
FIG. 7 is a diagram of an IC device, in accordance with some embodiments.

FIG. 7 is a diagram of IC device 700, in accordance with some embodiments. IC device 700 includes active areas AA1-AA4, gate structures G1-G3, power rails P1-P3, vias V1 and V2, and a metal segment MS1. Active areas AA1-AA4 correspond to active regions AR1-AR4, gate structures G1-G3 correspond to gate regions GR1-GR3, and power rails P1-P3 correspond to power rail regions PR1-PR3, each discussed above with respect to IC layout diagram 200 and FIGS. 1 and 2.

The depiction of IC device 700 is simplified for the purpose of illustration. In various embodiments, IC device 700 includes additional features, e.g., contacts, S/D structures, additional vias and metal segments, isolation structures, and the like. In some embodiments, IC device 700 includes one or more active areas (not shown) in addition to active areas AA1-AA4 and one or more gate structures (not shown) in addition to gate structures G1-G3, e.g., in accordance with the embodiments discussed above with respect to FIGS. 3-6.

By corresponding to active regions AR1-AR4, each of active areas AA1-AA4 has the p-type or n-type, includes first through fourth total numbers of fins F1-F4, and has adjacency to the other active areas AA1-AA4 in accordance with the various embodiments discussed above with respect to IC layout diagrams 200, 400C, 400E, and 400G and FIGS. 1-6. Accordingly each of active areas AA1 and AA4 is one type of the n-type or p-type and each of active areas AA2 and AA3 is the other type of the n-type or p-type.

By corresponding to gate regions GR1-GR3, each of gate structures G1-G4 is configured in accordance with the various embodiments discussed above with respect to IC layout diagrams 200, 400C, 400E, and 400G and FIGS. 1-6.

Each of power rails P1-P3 includes one or more conductive segments and is configured as either a reference power rail or a power supply power rail. Each of vias V1 and V2 includes one or more conductive segments and is electrically connected to a corresponding one of power rails P1 or P3. Metal segment MS1 includes a conductive segment and is electrically connected to each of vias V1 and V2.

By the configuration depicted in FIG. 7, IC device 700 includes power rails P1 and P3 electrically connected to each other and electrically isolated from power rail P2. In various embodiments, IC device 700 includes power rails P1 and P3 otherwise configured to be electrically connected to each other and electrically isolated from power rail P2.

In the embodiment depicted in FIG. 7, each of power rails P1-P3 overlies each of gate structures G1-G3. In various embodiments one or more of power rails P1-P3 includes a buried power rail such that each of gate structures G1-G3 overlies each of power rails P1-P3.

In various embodiments, either the third power rail is configured as a reference power rail, each of active areas AA2 and AA3 is the n-type, and each of active areas AA1 and AA4 is the p-type, or the third power rail is configured as a supply power rail, each of active areas AA2 and AA3 is the p-type, and each of active areas AA1 and AA4 is the n-type.

By having configurations corresponding to those of the various embodiments of IC layout diagram 200, as discussed above, the various embodiments of IC device 700 are capable of realizing the benefits discussed above with respect to IC layout diagrams 200, 400C, 400E, and 400G and FIGS. 1-6.

Figure 8:
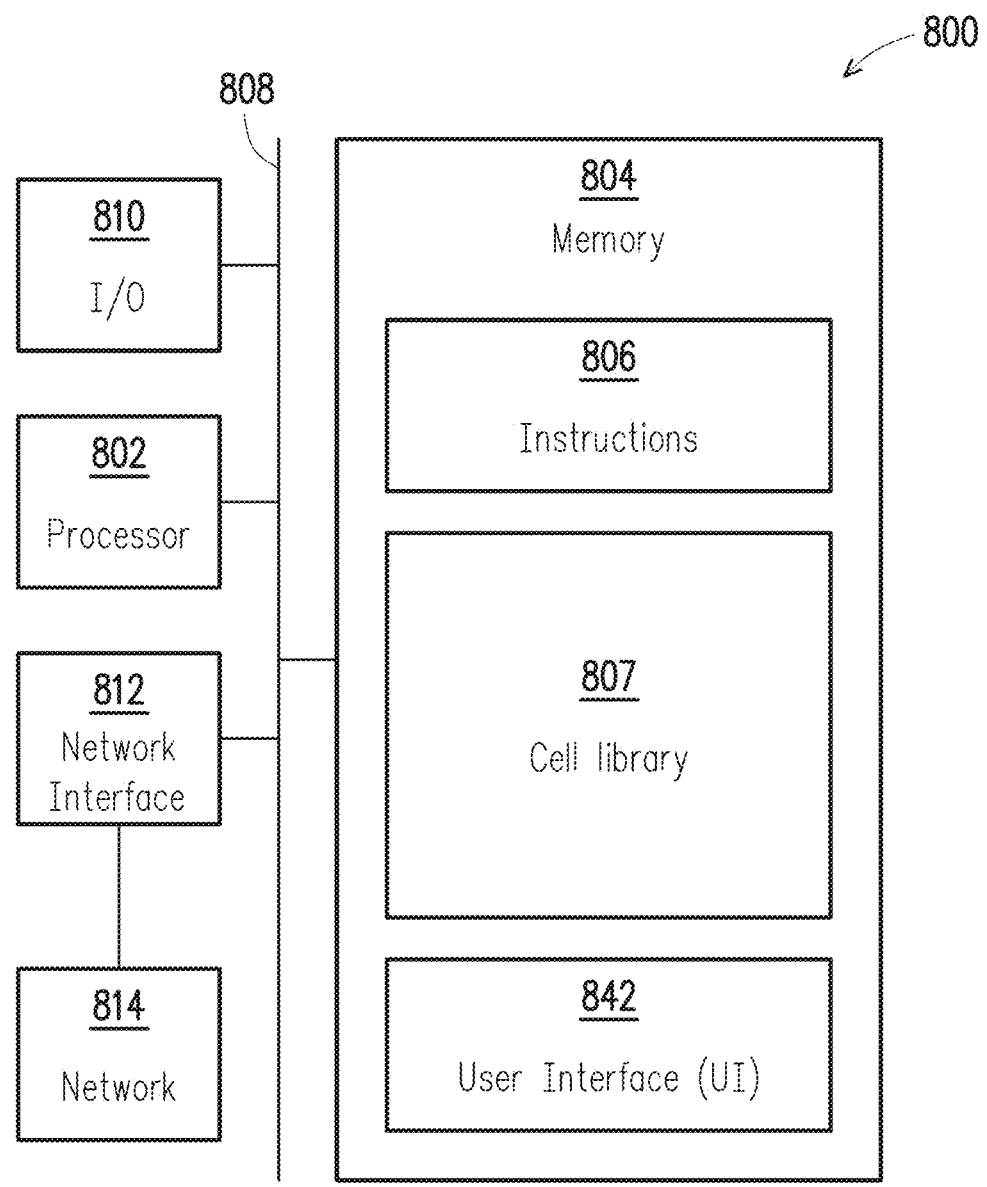
FIG. 8 is a block diagram of an IC layout diagram generation system, in accordance with some embodiments.

FIG. 8 is a block diagram of IC layout diagram generation system 800, in accordance with some embodiments. Methods described herein of designing IC layout diagrams in accordance with one or more embodiments are implementable, for example, using IC layout diagram generation system 800, in accordance with some embodiments.

In some embodiments, IC layout diagram generation system 800 is a general purpose computing device including a hardware processor 802 and a non-transitory, computer-readable storage medium 804. Storage medium 804, amongst other things, is encoded with, i.e., stores, computer program code 806, i.e., a set of executable instructions. Execution of instructions 806 by hardware processor 802 represents (at least in part) an EDA tool which implements a portion or all of a method, e.g., the method of generating an IC layout diagram described above (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause IC layout diagram generation system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause IC layout diagram generation system 800 (where such execution represents (at least in part) the EDA tool) to be usable for performing a portion or all of the noted processes and/or methods. In one or more embodiments, storage medium 804 also stores information which facilitates performing a portion or all of the noted processes and/or methods. In one or more embodiments, storage medium 804 stores cell library 807 of cells including such cells as disclosed herein, e.g., a double height cell 200C discussed above with respect to FIGS. 1 and 2.

IC layout diagram generation system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

IC layout diagram generation system 800 also includes network interface 812 coupled to processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC layout diagram generation systems 800.

IC layout diagram generation system 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. IC layout diagram generation system 800 is configured to receive information related to a UI through I/O interface 810. The information is stored in computer-readable storage medium 804 as user interface (UI) 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC layout diagram generation system 800. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
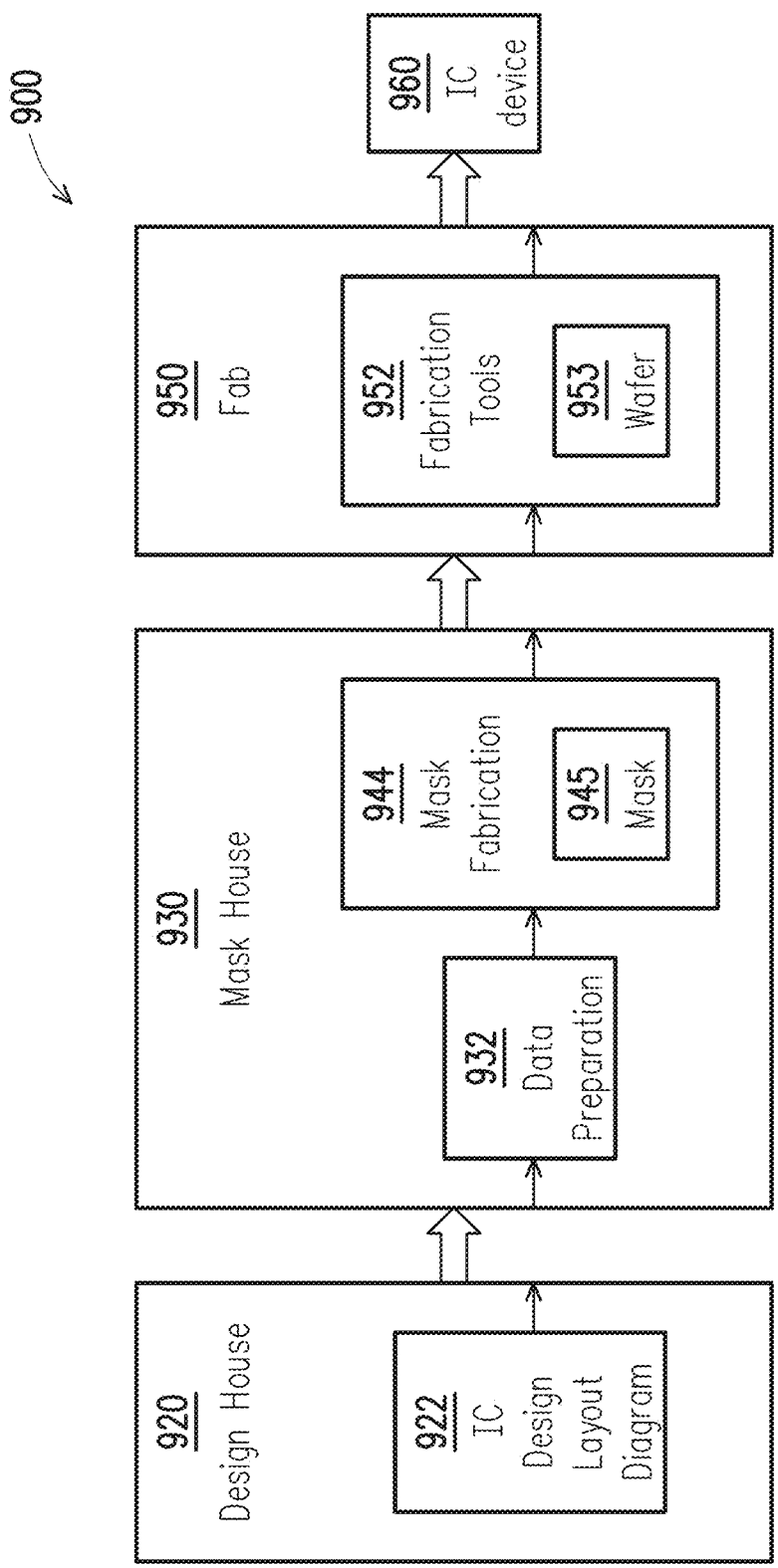
FIG. 9 is a block diagram of an IC manufacturing system, and an IC manufacturing flow associated therewith, in accordance with some embodiments.

FIG. 9 is a block diagram of IC manufacturing system 900, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 900.

In FIG. 9, IC manufacturing system 900 includes entities, such as a design house 920, a mask house 930, and an IC manufacturer/fabricator ("fab") 950, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 950 is owned by a single larger company. In some embodiments, two or more of design house 920, mask house 930, and IC fab 950 coexist in a common facility and use common resources.

Design house (or design team) 920 generates an IC design layout diagram 922. IC design layout diagram 922 includes various geometrical patterns, e.g., an IC layout diagram discussed above. The geometrical patterns correspond to patterns of metal, oxide, or semiconductor layers that make up the various components of IC device 960 to be fabricated. The various layers combine to form various IC features. For example, a portion of IC design layout diagram 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout diagram 922. The design procedure includes one or more of logic design, physical design or place and route. IC design layout diagram 922 is presented in one or more data files having information of the geometrical patterns. For example, IC design layout diagram 922 can be expressed in a GDSII file format or DFII file format.

Mask house 930 includes data preparation 932 and mask fabrication 944. Mask house 930 uses IC design layout diagram 922 to manufacture one or more masks 945 to be used for fabricating the various layers of IC device 960 according to IC design layout diagram 922. Mask house 930 performs mask data preparation 932, where IC design layout diagram 922 is translated into a representative data file ("RDF"). Mask data preparation 932 provides the RDF to mask fabrication 944. Mask fabrication 944 includes a mask writer. A mask writer converts the RDF to an image on a substrate, such as a mask (reticle) 945 or a semiconductor wafer 953. The design layout diagram 922 is manipulated by mask data preparation 932 to comply with particular characteristics of the mask writer and/or requirements of IC fab 950. In FIG. 9, mask data preparation 932 and mask fabrication 944 are illustrated as separate elements. In some embodiments, mask data preparation 932 and mask fabrication 944 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout diagram 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout diagram 922 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 922 to compensate for limitations during mask fabrication 944, which may undo part of the modifications performed by OPC in order to meet mask creation rules.

In some embodiments, mask data preparation 932 includes lithography process checking (LPC) that simulates processing that will be implemented by IC fab 950 to fabricate IC device 960. LPC simulates this processing based on IC design layout diagram 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 922.

It should be understood that the above description of mask data preparation 932 has been simplified for the purposes of clarity. In some embodiments, data preparation 932 includes additional features such as a logic operation (LOP) to modify the IC design layout diagram 922 according to manufacturing rules. Additionally, the processes applied to IC design layout diagram 922 during data preparation 932 may be executed in a variety of different orders.

After mask data preparation 932 and during mask fabrication 944, a mask 945 or a group of masks 945 are fabricated based on the modified IC design layout diagram 922. In some embodiments, mask fabrication 944 includes performing one or more lithographic exposures based on IC design layout diagram 922. In some embodiments, an electron-beam (e-beam) or a mechanism of multiple e-beams is used to form a pattern on a mask (photomask or reticle) 945 based on the modified IC design layout diagram 922. Mask 945 can be formed in various technologies. In some embodiments, mask 945 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 945 includes a transparent substrate (e.g., fused quartz) and an opaque material (e.g., chromium) coated in the opaque regions of the binary mask. In another example, mask 945 is formed using a phase shift technology. In a phase shift mask (PSM) version of mask 945, various features in the pattern formed on the phase shift mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in semiconductor wafer 953, in an etching process to form various etching regions in semiconductor wafer 953, and/or in other suitable processes.

IC fab 950 is an IC fabrication business that includes one or more manufacturing facilities for the fabrication of a variety of different IC products. In some embodiments, IC Fab 950 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 950 includes wafer fabrication tools 952 configured to execute various manufacturing operations on semiconductor wafer 953 such that IC device 960 is fabricated in accordance with the mask(s), e.g., mask 945. In various embodiments, fabrication tools 952 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 950 uses mask(s) 945 fabricated by mask house 930 to fabricate IC device 960. Thus, IC fab 950 at least indirectly uses IC design layout diagram 922 to fabricate IC device 960. In some embodiments, semiconductor wafer 953 is fabricated by IC fab 950 using mask(s) 945 to form IC device 960. In some embodiments, the IC fabrication includes performing one or more lithographic exposures based at least indirectly on IC design layout diagram 922. Semiconductor wafer 953 includes a silicon substrate or other proper substrate having material layers formed thereon. Semiconductor wafer 953 further includes one or more of various doped regions, dielectric features, multi-level interconnects, and the like (formed at subsequent manufacturing steps).

Details regarding an IC manufacturing system (e.g., system 900 of FIG. 9), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method of generating an IC layout diagram includes positioning a first active region in a cell of the IC layout diagram, the first active region being a first type of an n-type or a p-type and corresponding to a first total number of fins, positioning a second active region in the cell adjacent to the first active region, the second active region being a second type of the n-type or the p-type and corresponding to a second total number of fins, positioning a third active region in the cell adjacent to the second active region, the third active region being the second type and corresponding to a third total number of fins, and positioning a fourth active region in the cell adjacent to the third active region, the fourth active region being the first type and corresponding to a fourth total number of fins. Each of the first and second total numbers of fins is greater than each of the third and fourth total numbers of fins, and at least one of the positioning the first, second, third, or fourth active regions is performed by a processor. In some embodiments, the method includes fabricating, based on the IC layout diagram, at least one of one or more semiconductor masks, or at least one component in a layer of a semiconductor IC. In some embodiments, each of the first and second total numbers of fins is greater than or equal to three, and each of the third and fourth total numbers of fins is less than or equal to two. In some embodiments, at least one of the first total number of fins is equal to the second total number of fins, or the third total number of fins is equal to the fourth total number of fins. In some embodiments, positioning the first through fourth active regions in the cell includes positioning the first through fourth active regions in a double height cell. In some embodiments, positioning the second and third active regions includes straddling a power rail track with the second and third active regions, and either the power rail track corresponds to a reference power rail and the second type is the n-type, or the power rail track corresponds to a supply power rail and the second type is the p-type. In some embodiments, the method includes intersecting each of the first through fourth active regions with a gate region, and intersecting the gate region with a cut poly region. In some embodiments, the method includes storing the IC layout diagram in a cell library.

In some embodiments, an IC layout generation system includes a processor and a non-transitory, computer readable storage medium including computer program code for one or more programs. The non-transitory, computer readable storage medium and the computer program code are configured to, with the processor, cause the system to assign a first set of blocks of a circuit to a first fin count, arrange the first set of blocks using first and second active regions of an IC layout cell, the first and second active regions collectively corresponding to a plurality of fins having the first fin count, arrange a second set of blocks of the circuit using third and fourth active regions of the IC layout cell, the third and fourth active regions collectively corresponding to a plurality of fins having a second fin count lower than the first fin count, and generate an IC layout file based on the IC layout cell. In some embodiments, the non-transitory, computer readable storage medium and the computer program code are configured to, with the processor, further cause the system to assign the first set of blocks to the first fin count based on a timing analysis of the circuit. In some embodiments, the non-transitory, computer readable storage medium and the computer program code are configured to, with the processor, further cause the system to calculate a speed level of the circuit based on the first set of blocks being assigned to the first fin count, compare the speed level to a threshold speed level, and based on the speed level being below the threshold speed level, assign an additional circuit block to the first fin count. In some embodiments, the non-transitory, computer readable storage medium and the computer program code are configured to, with the processor, further cause the system to calculate a circuit power level as a sum of a power level of the first set of blocks based on the first fin count and a power level of the second set of blocks based on the second fin count, compare the circuit power level to a threshold power level, and based on the circuit power level exceeding the threshold power level, reassign a block of the first set of blocks to the second fin count. In some embodiments, the non-transitory, computer readable storage medium and the computer program code are configured to, with the processor, further cause the system to, after the reassigning the block of the first set of blocks to the second fin count, calculate a circuit speed level based on the first set of blocks. In some embodiments, the non-transitory, computer readable storage medium and the computer program code are configured to, with the processor, further cause the system to calculate an area efficiency level based on the first set of blocks being assigned to the first fin count and the second set of blocks being assigned to the second fin count, compare the area efficiency level to an area efficiency limit, and based on the area efficiency level being outside the area efficiency limit, rebalance the fin count assignments by at least one of reassigning a block of the second set of blocks to the first fin count or reassigning a block of the first set of blocks to the second fin count. In some embodiments, the non-transitory, computer readable storage medium and the computer program code are configured to, with the processor, further cause the system to, after the rebalancing the fin count assignments, calculate a circuit speed level based on the first set of blocks. In some embodiments, the first fin count is greater than or equal to six and the second fin count is less than or equal to four.

In some embodiments, an IC device includes a first power rail, a second power rail electrically connected to the first power rail, a third power rail between the first and second power rails and electrically isolated from the first and second power rails, a first active area of a first type, adjacent to the first power rail, and including a first total number of fins, a second active area of a second type different from the first type, adjacent to the first active area and the third power rail, and including a second total number of fins, a third active area of the second type, adjacent to the third power rail, and including a third total number of fins, and a fourth active area of the first type, adjacent to the third active area and the second power rail, and including a fourth total number of fins. A first sum of the first and second total numbers of fins is greater than a second sum of the third and fourth total numbers of fins. In some embodiments, the first sum is greater than or equal to six, and the second sum is less than or equal to four. In some embodiments, either the third power rail is configured as a reference power rail and the second type is an n-type, or the third power rail is configured as a supply power rail and the second type is a p-type. In some embodiments, at least one of the first power rail, the second power rail, or the third power rail includes a buried power rail.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of generating an integrated circuit (IC) layout diagram, the method comprising:
    positioning a first active region in a cell of the IC layout diagram, the first active region being a first type of an n-type or a p-type and corresponding to a first total number of fins;
    positioning a second active region in the cell adjacent to the first active region, the second active region being a second type of the n-type or the p-type and corresponding to a second total number of fins;
    positioning a third active region in the cell adjacent to the second active region, the third active region being the second type and corresponding to a third total number of fins; and
    positioning a fourth active region in the cell adjacent to the third active region, the fourth active region being the first type and corresponding to a fourth total number of fins,
    wherein
        each of the first and second total numbers of fins is greater than each of the third and fourth total numbers of fins, and
        at least one of the positioning the first, second, third, or fourth active regions is performed by a processor.

2. The method of claim 1, further comprising fabricating, based on the IC layout diagram, at least one of:
    one or more semiconductor masks, or
    at least one component in a layer of a semiconductor IC.

3. The method of claim 1, wherein
    each of the first and second total numbers of fins is greater than or equal to three, and
    each of the third and fourth total numbers of fins is less than or equal to two.

4. The method of claim 1, wherein at least one of
    the first total number of fins is equal to the second total number of fins, or
    the third total number of fins is equal to the fourth total number of fins.

5. The method of claim 1, wherein the positioning the first through fourth active regions in the cell comprises positioning the first through fourth active regions in a double height cell.

6. The method of claim 1, wherein
    the positioning the second and third active regions comprises straddling a power rail track with the second and third active regions, and
    either the power rail track corresponds to a reference power rail and the second type is the n-type, or the power rail track corresponds to a supply power rail and the second type is the p-type.

7. The method of claim 1, further comprising:
    intersecting each of the first through fourth active regions with a gate region; and
    intersecting the gate region with a cut poly region.

8. The method of claim 1, further comprising storing the IC layout diagram in a cell library.

9. An integrated circuit (IC) layout generation system comprising:
a processor; and
a non-transitory, computer readable storage medium including computer program code for one or more programs, the non-transitory, computer readable storage medium and the computer program code being configured to, with the processor, cause the system to:
assign a first set of blocks of a circuit to a first fin count;
arrange the first set of blocks using first and second active regions of an IC layout cell, the first and second active regions collectively corresponding to a plurality of fins having the first fin count;
arrange a second set of blocks of the circuit using third and fourth active regions of the IC layout cell, the third and fourth active regions collectively corresponding to a plurality of fins having a second fin count lower than the first fin count; and
generate an IC layout file based on the IC layout cell.

10. The IC layout generation system of claim 9, wherein the non-transitory, computer readable storage medium and the computer program code are configured to, with the processor, further cause the system to:
assign the first set of blocks to the first fin count based on a timing analysis of the circuit.

11. The IC layout generation system of claim 9, wherein the non-transitory, computer readable storage medium and the computer program code are configured to, with the processor, further cause the system to:
calculate a speed level of the circuit based on the first set of blocks being assigned to the first fin count;
compare the speed level to a threshold speed level; and
based on the speed level being below the threshold speed level, assign an additional circuit block to the first fin count.

12. The IC layout generation system of claim 9, wherein the non-transitory, computer readable storage medium and the computer program code are configured to, with the processor, further cause the system to:
calculate a circuit power level as a sum of a power level of the first set of blocks based on the first fin count and a power level of the second set of blocks based on the second fin count;
compare the circuit power level to a threshold power level; and
based on the circuit power level exceeding the threshold power level, reassign a block of the first set of blocks to the second fin count.

13. The IC layout generation system of claim 12, wherein the non-transitory, computer readable storage medium and the computer program code are configured to, with the processor, further cause the system to:
after the reassigning the block of the first set of blocks to the second fin count, calculate a circuit speed level based on the first set of blocks.

14. The IC layout generation system of claim 9, wherein the non-transitory, computer readable storage medium and the computer program code are configured to, with the processor, further cause the system to:
calculate an area efficiency level based on the first set of blocks being assigned to the first fin count and the second set of blocks being assigned to the second fin count;
compare the area efficiency level to an area efficiency limit; and
based on the area efficiency level being outside the area efficiency limit, rebalance fin count assignments by at least one of reassigning a block of the second set of blocks to the first fin count or reassigning a block of the first set of blocks to the second fin count.

15. The IC layout generation system of claim 14, wherein the non-transitory, computer readable storage medium and the computer program code are configured to, with the processor, further cause the system to:
after the rebalancing the fin count assignments, calculate a circuit speed level based on the first set of blocks.

16. The IC layout generation system of claim 9, wherein the first fin count is greater than or equal to six, and the second fin count is less than or equal to four.

17. An integrated circuit (IC) device comprising:
a first power rail;
a second power rail electrically connected to the first power rail;
a third power rail between the first and second power rails and electrically isolated from the first and second power rails;
a first active area of a first type, adjacent to the first power rail, and comprising a first total number of fins;
a second active area of a second type different from the first type, adjacent to the first active area and the third power rail, and comprising a second total number of fins;
a third active area of the second type, adjacent to the third power rail, and comprising a third total number of fins; and
a fourth active area of the first type, adjacent to the third active area and the second power rail, and comprising a fourth total number of fins,
wherein a first sum of the first and second total numbers of fins is greater than a second sum of the third and fourth total numbers of fins.

18. The IC device of claim 17, wherein the first sum is greater than or equal to six, and the second sum is less than or equal to four.

19. The IC device of claim 17, wherein either
the third power rail is configured as a reference power rail and the second type is an n-type, or
the third power rail is configured as a supply power rail and the second type is a p-type.

20. The IC device of claim 17, wherein at least one of the first power rail, the second power rail, or the third power rail comprises a buried power rail.

* * * * *